(12) United States Patent
Koyama et al.

(10) Patent No.: US 7,814,144 B2
(45) Date of Patent: Oct. 12, 2010

(54) RECOMMENDING SYSTEM, RECOMMENDING SERVER, CONTENT RECOMMENDING METHOD, AND RECOMMENDING PROGRAM PRODUCT

(75) Inventors: Noriaki Koyama, Tokyo (JP); Tetsuya Gotou, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 509 days.

(21) Appl. No.: 11/844,064

(22) Filed: Aug. 23, 2007

(65) Prior Publication Data

US 2008/0082633 A1    Apr. 3, 2008

(30) Foreign Application Priority Data

Aug. 24, 2006 (JP) .............................. 2006-228116

(51) Int. Cl.
*G06F 15/16* (2006.01)
(52) U.S. Cl. ...................... 709/203; 709/202; 709/217; 709/219; 709/227; 709/231; 709/232; 709/235; 725/4; 725/19; 725/29; 725/35; 725/39; 725/46; 725/114
(58) Field of Classification Search ................. 709/202, 709/203, 217, 227, 231, 232, 235, 219; 725/4, 725/19, 29, 35, 39, 114
See application file for complete search history.

(56) References Cited

U.S. PATENT DOCUMENTS 6,950,804 B2* 9/2005 Strietzel ...................... 705/26
2004/0260786 A1* 12/2004 Barile ......................... 709/217
2006/0020662 A1* 1/2006 Robinson .................... 709/203
2007/0186254 A1* 8/2007 Tsutsui et al. ................. 725/87
2007/0269787 A1* 11/2007 Cronstrom .................. 434/350
2008/0163302 A1* 7/2008 Khedouri et al. ............. 725/46
2008/0301737 A1* 12/2008 Hjelmeland Almas et al. 725/61

FOREIGN PATENT DOCUMENTS

JP    2006-18626    1/2006
JP    2006-108831   4/2006

* cited by examiner

*Primary Examiner*—Michael Won
(74) *Attorney, Agent, or Firm*—Oblon, Spivak, McClelland, Maier & Neustadt, L.L.P.

(57) ABSTRACT

The present invention relates to a recommending system that recommends content so as to keep constant network traffic between a user terminal and a server. The recommending system includes a user terminal, a content server that transmits content prestored in a storage device to the user terminal, and a recommending server that transmits recommendation data, which are connected via a network. The recommending server includes a communications unit that transmits the recommendation data to the user terminal, the recommendation data containing an identifier of provided content and a time, at which the content server starts providing the content to the user terminal, in correspondence with the identifier of the provided content. The user terminal includes a download unit that transmits the content request containing the identifier of the provided content to the content server at the time in correspondence with the identifier of the provided content in the recommendation data.

7 Claims, 15 Drawing Sheets

RECOMMENDING SYSTEM, RECOMMENDING SERVER, CONTENT RECOMMENDING METHOD, AND RECOMMENDING PROGRAM PRODUCT

CROSS REFERENCE TO RELATED APPLICATIONS

This application claims benefit of priority under 35 USC §119 to Japanese Patent Application No. 2006-228116 filed on Aug. 24, 2006, the entire contents of which are incorporated by reference herein.

BACKGROUND OF THE INVENTION

1. Field of the Invention

The present invention relates to a recommending system, a recommending server, a content recommending method, and a recommender program product for recommending content provided by a content server to a user terminal.

2. Description of the Related Art

As network-based data communications advance, so does also service which a server offers to provide prestored content, such as image and audio data, to a user terminal in response to a request for download.

Although the network is capable of transmitting data of predetermined size, the content, such as the image and audio data, is of large size. Accordingly, in some cases, data communications between the server and the user terminal become impossible with an increase in communications traffic in the network.

To deal with this problem, JP-A 2006-108831 (Kokai) (Patent Document 1) discloses a technique intended for the purpose of reducing the volume of network traffic. To achieve the purpose, the technique involves a procedure. Specifically, when a receiving terminal (or a user terminal) sends a request for data to a server, the server schedules the multicasting or broadcasting of the data to the receiving terminal and follows the schedule of data transmission. Meanwhile, the receiving terminal rearranges and uses the data received as scheduled by the server.

JP-A 2006-18626 (Kokai) (Patent Document 2) discloses another technique for controlling traffic for content distribution. In this case, a user pays the price for content to a content provider in order for a user terminal to download the content. To achieve a high degree of servicing efficiency and a high level of satisfaction with used service, the server in the technique controls the selling prices of content according to the status of computer resources while monitoring the computer resources.

However, the above technique disclosed in Patent Document 1 has a problem as given below. When downloading data, the receiving terminal, at time of sending a request for content data to the server, may not know the time at which receipt of the content data is possible. Specifically, assume a case where the content data is popular, and hence plural receiving terminals access the server all at once during a period of time between the time scheduled by the server and the time of broadcasting of the schedule. In such a case, not only downloading but also login takes time even at the scheduled time, and the actual time of completion of receipt of the content data is thus unknown.

This is the problem involved in the technique disclosed in Patent Document 1. The problem is caused by adoption of a method in which the server schedules content distribution only after the receipt of the request for data from the receiving terminal. In other words, the problem results from the technique being unable to predict what kind of content each of all receiving terminals is likely to download by issuing the request for data.

In the above technique disclosed in Patent Document 2, the selling price of content is set according to the status of the resources when the user terminal is about to download the content. Accordingly, the provided service cannot always fully satisfies the user demands. A reason is that the selling price of desired content to be downloaded is set high if the content is popular.

SUMMARY OF THE INVENTION

The present invention has been made in consideration for the foregoing problems inherent in the related art. An object of the present invention is to provide a recommending system, a recommending server, a content recommending method, and a recommender program, which predict content which each individual user terminal is likely to download when downloading content from a content server; thereby predict busy times when accesses to individual pieces of content for downloading are made all at once; and thereby recommend a subscription time to each individual user terminal so that each individual user terminal can download content at the subscription time, in order to keep constant network traffic between each individual user terminal and the server.

The present invention provides a recommending system including a user terminal, a content server that transmits content prestored in a storage device to the user terminal in response to a content request from the user terminal, and a recommending server that transmits recommendation data in response to a recommendation request from the user terminal, which are connected to each other via a network. The present invention is characterized in that the recommending server includes a communications unit that transmits the recommendation data to the user terminal upon receipt of the recommendation request from the user terminal, the recommendation data containing an identifier of provided content and a subscription time in correspondence with the identifier of the provided content, at which the content server starts providing the content to the user terminal. The present invention is further characterized in that the user terminal includes a download unit that transmits the content request containing the identifier of the provided content to the content server at the subscription time in correspondence with the identifier of the provided content in the recommendation data, when the identifier of the provided content contained in the received recommendation data is selected to input an operation signal for downloading the content.

The present invention enables recommending content so as to keep constant network traffic between the user terminal and the server, when the user terminal downloads the content from the content server.

DETAILED DESCRIPTION OF THE INVENTION (Recommending System)

Figure 1:
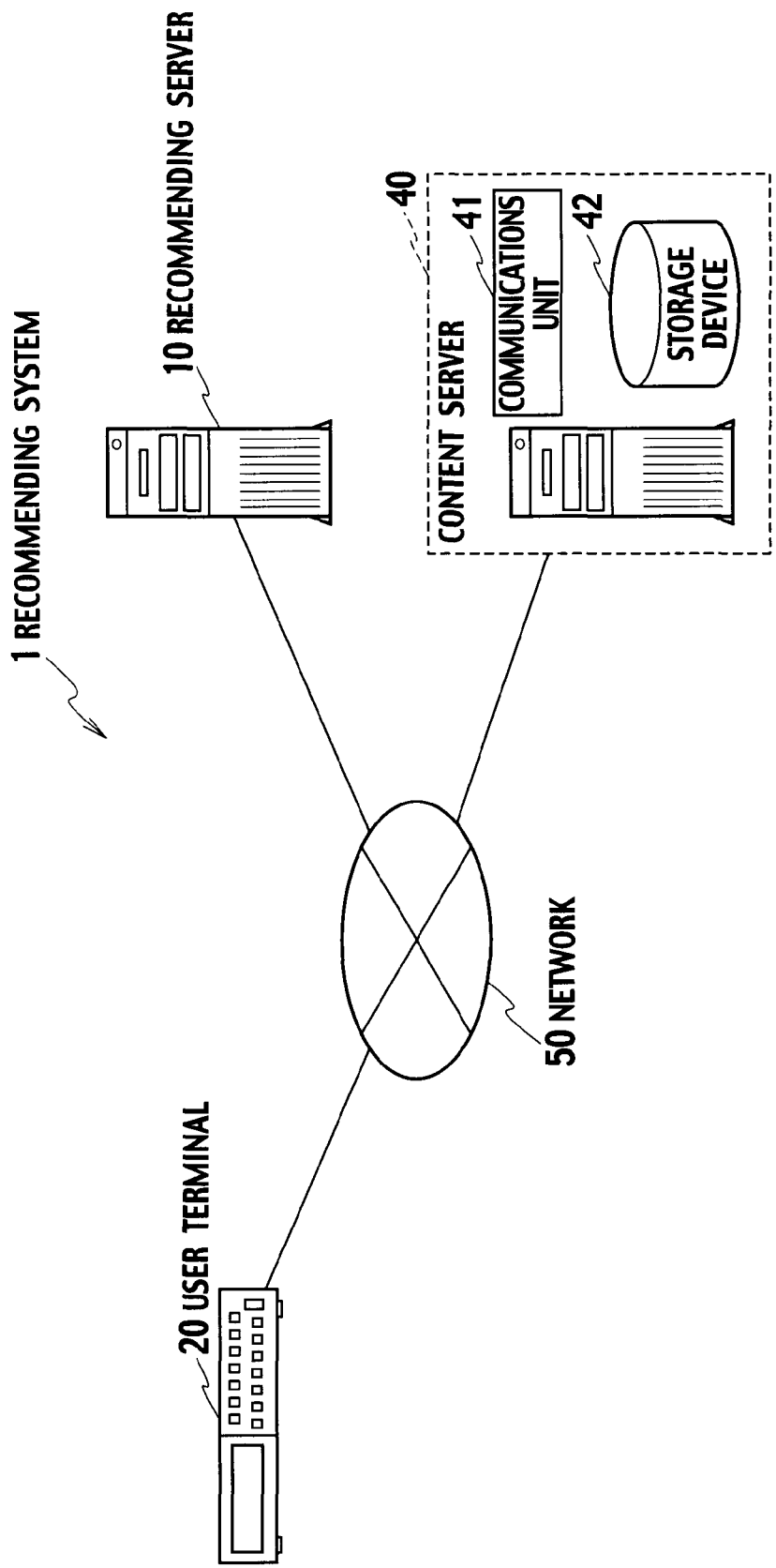
FIG. 1 is an illustration of assistance in explaining the configuration of a recommending system according to a preferred embodiment of the present invention.

As shown in FIG. 1, a recommending system 1 according to a preferred embodiment of the present invention includes a recommending server 10, a user terminal 20, and a content server 40, which are connected to each other via a network 50.

In the recommending system 1 shown in FIG. 1, the content server 40 provides content in response to a request from the user terminal 20. The user terminal 20 sends the request for content selected from a content recommend list produced by the recommending server 10 to the content server 40. The recommending server 10 preacquires and prestores data on content provided by the content server 40, and produces the content recommendation list from the stored data. The recommending server 10 produces the content recommendation list, taking into account log and other data on content which the user terminal 20 has previously downloaded from the content server 40.

In the recommending system 1 shown in FIG. 1, the recommending server 10, the user terminal 20, and the content server 40, one each, are connected for the sake of convenience, but they, two or more each, may be connected.

Figure 2:
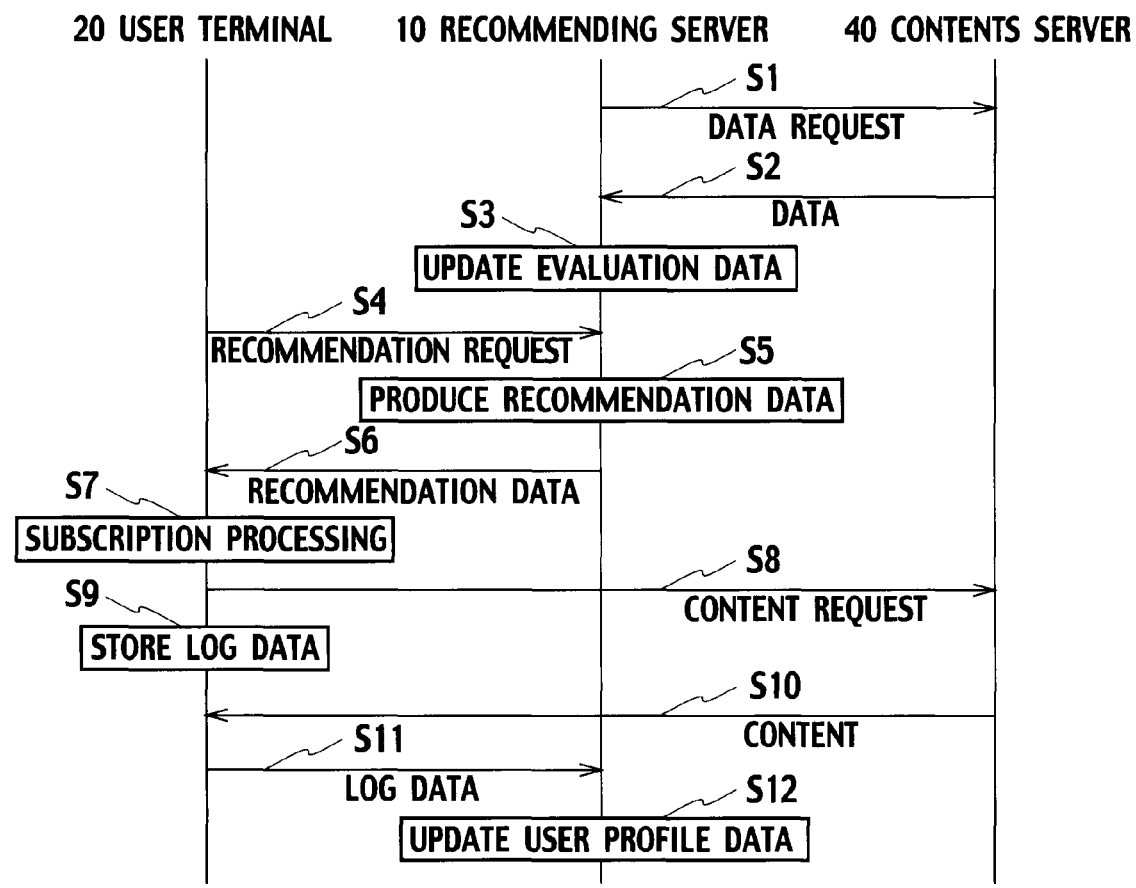
FIG. 2 is a sequence diagram of assistance in explaining processing carried out by the recommending system according to the preferred embodiment of the present invention.

A simple flow of processing by the recommending system 1 shown in FIG. 1 will be described with reference to a sequence diagram shown in FIG. 2. In the recommending system 1, the recommending server 10 sends a data request to the content server 40 (at step S1). The data request is the request for the data on the content provided by the content server 40.

Upon receipt of the data from the content server 40 in response to the data request, the recommending server 10 places the received data in a storage device, which in turn stores the data (at step S2). The recommending server 10 also updates evaluation data on a track record of downloading (or a download count) of other content similar to individual pieces of content, in accordance with the received data (at step S3). The evaluation data will be described later with reference to FIG. 9.

Then, the user terminal 20 sends a recommendation request to the recommending server 10 (at step S4). The "recommendation request" is the request for data on content which the content server 40 provides to the user terminal 20.

Upon receipt of the recommendation request, the recommending server 10 produces recommendation data (at step S5), and transmits the recommendation data to the user terminal 20 (at step S6). The "recommendation data" is the data containing the recommend list of content which the recommending server 10 recommends the user terminal 20 to download from the content server 40. The recommending server 10 selects content that exactly suits or is close to the preferences of the user terminal 20 (or user's preferences) from the evaluation data updated at step S3, and produces the recommendation data.

The user terminal 20 subscribes to downloading of content by referring to the received recommendation data (at step S7), and sends a content request to download the content to the content server 40 at a subscription time (at step S8). When sending the content request, the user terminal 20 also stores log data on a log of the content download (at step S9). The log data will be described later with reference to FIG. 4.

The content server 40 provides the content to the user terminal 20 in response to the received content request (at step S10).

The user terminal 20 transmits the log data stored at step S9 to the recommending server 10 at a predetermined time (at step S11). The recommending server 10 updates user profile data according to the log data received from the user terminal 20 (at step S12). The user profile data will be described later with reference to FIG. 10.

(Content Server)

The content server 40 includes a communications unit 41 and a storage device 42, as shown in FIG. 1. The storage device 42 stores content and content-related data (e.g., a genre, a cast, a data size, etc.) in correspondence with a content ID. The "content" is herein described as video data which a recorder uses (or records, subscribes to, or otherwise handles), program data, program-related data, various screen data, and so on.

In response to the content request received from the user terminal 20, the communications unit 41 reads out corresponding content selected from the content stored in the storage device 42, and transmits the content to the user terminal 20. In response to the data request received from the recommending server 10, the communications unit 41 also reads out corresponding data selected from the content stored in the storage device 42, and transmits the data on another available content to the recommending server 10.

(User Terminal)

Figure 3:
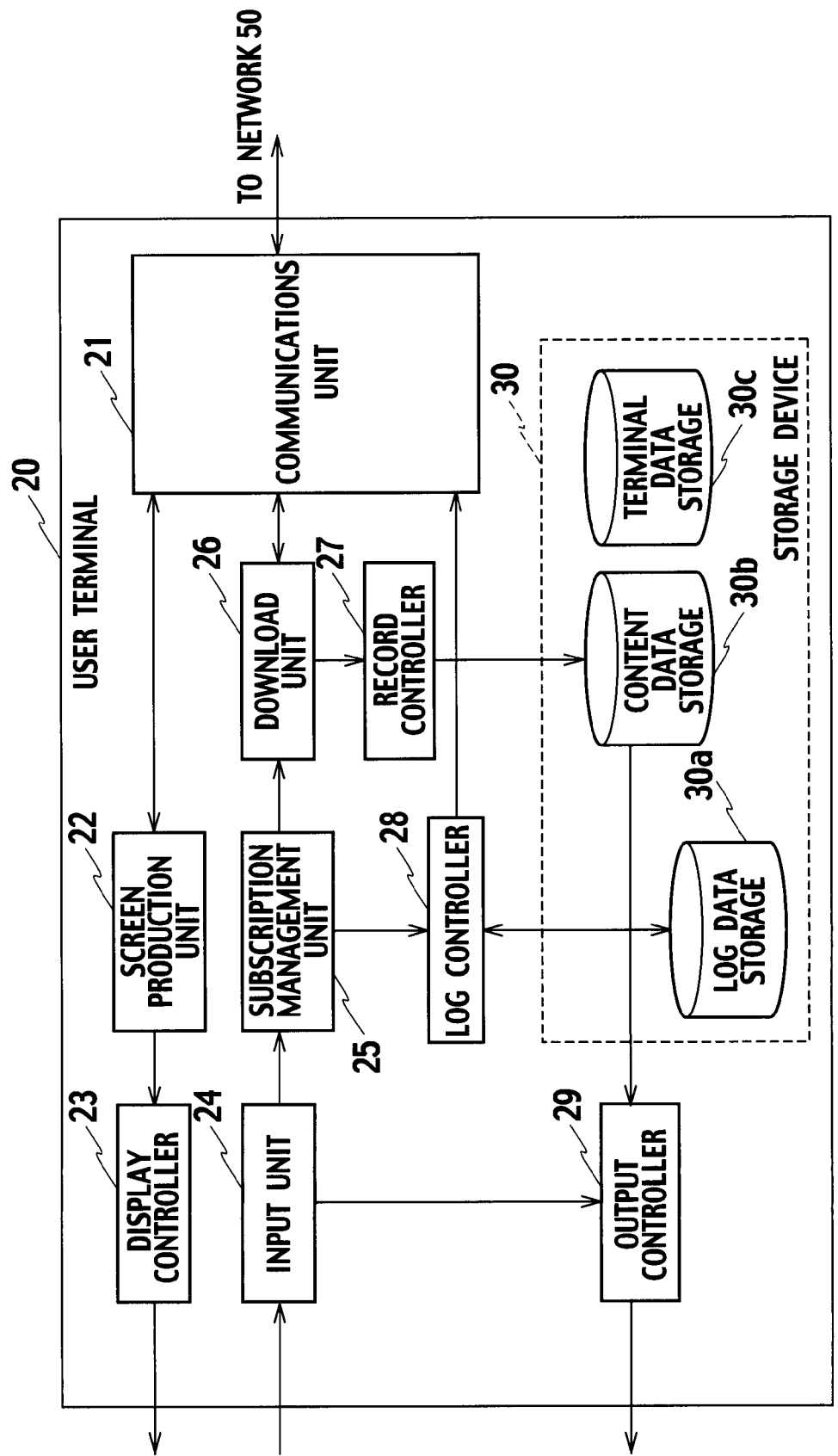
FIG. 3 is a functional block diagram of assistance in explaining the configuration of a user terminal of the recommending system according to the preferred embodiment of the present invention.

As shown in FIG. 3, the user terminal 20 includes a communications unit 21, a screen production unit 22, a display controller 23, an input unit 24, a subscription management unit 25, a download unit 26, a record controller 27, a log controller 28, and an output controller 29. The user terminal 20 also includes a storage device 30 including a log data storage 30a, a content data storage 30b, and a terminal data storage 30c that stores terminal data containing a terminal ID that identifies the user terminal 20.

The communications unit 21 transmits the recommendation request, the log data and the like to the recommending server 10 via the network 50. The communications unit 21 also transmits the content request to the content server 40. In addition, the communications unit 21 receives the recommendation data transmitted from the recommending server 10 via the network 50, and the content transmitted from the content server 40 via the network 50. The "recommendation request" contains a user ID that is an identifier of the user terminal 20 transmitting the recommendation request, and the user terminal 20 transmits the recommendation request at a user-specified time, for example. The user ID is a user identifier. In the embodiment, each individual terminal is permitted to download different pieces of content or the same content in a case where one user owns plural terminals, for example, a digital versatile disc (DVD) recorder and a television.

The screen production unit 22 converts the recommendation data, which is received from the recommending server 10 via the communications unit 21, into a recommend screen in a displayable form. Under control of the display controller 23, the recommend screen produced by the screen production unit 22 appears on a display (not shown) connected via a transmission line. An example of the recommend screen will be described later with reference to FIG. 13.

The input unit 24 receives an input of an operation signal for download subscription or an operation signal for content output or the like, which are generated according to user operation using an input device such as an operation button.

Upon receipt of the input of the operation signal for download subscription via the input unit 24, the subscription management unit 25 outputs to the download unit 26 the content ID and the subscription time in correspondence with the content ID in the recommendation data, and outputs to the log controller 28 the content ID and the details of content, namely, the "title," "genre," and "cast" of the content.

At the subscription time inputted from the subscription management unit 25, the download unit 26 sends the content request to the content server 40 via the communications unit 21, downloads the content, and then outputs the downloaded content to the record controller 27. The "content request" contains the user ID and the content ID of content requested to be downloaded.

The record controller 27 places, in the content data storage 30b, the content inputted from the download unit 26, and the content data storage 30b in turn stores the content. The content data storage 30b stores plural pieces of content downloaded by the download unit 26, as identified by their content IDs.

The log controller 28 produces the log data containing the content ID and the data on the newly subscribed content (or the details of the content, etc.) inputted from the subscription management unit 25, and places the log data in the log data storage 30a, which in turn stores the log data. The log controller 28 also transmits the log data stored in the log data storage 30a to the recommending server 10 at a predetermined time. The timing of transmission of the log data by the user terminal 20 is, for example, the predetermined timing such as regular timing.

Figure 4:
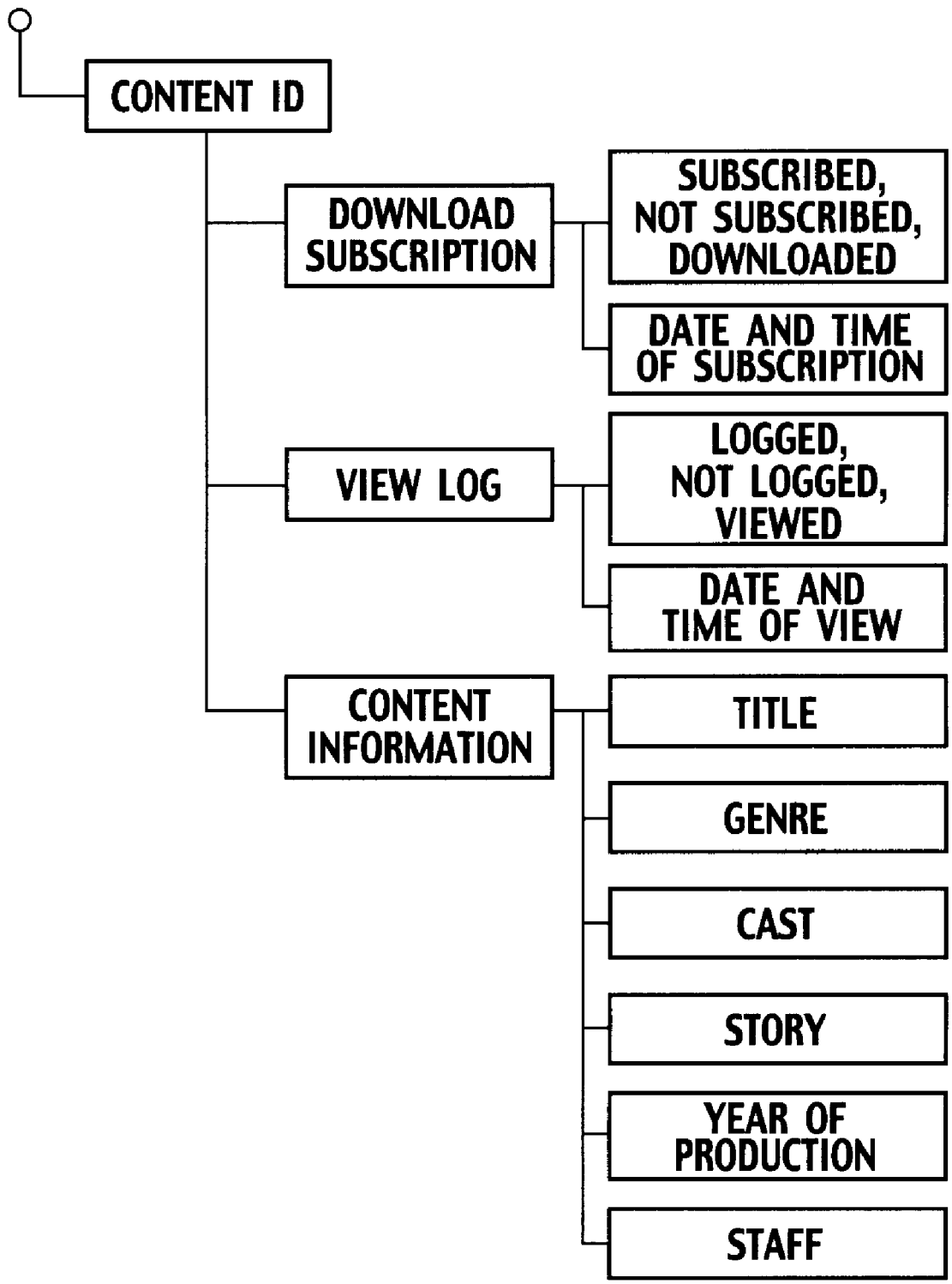
FIG. 4 is a diagram of assistance in explaining an example of log data for use in the user terminal.

An example of the log data stored in the log data storage 30a will be described with reference to FIG. 4. The log data shown in FIG. 4 contains the "content ID" as a key, and data on "download subscription," "view log" and "content information" in correspondence with the "content ID." The data on the "download subscription" contains the presence or absence of content download subscription, and the date and time of subscription. The data on the "view log" contains the presence or absence of the view log of downloaded content, and the date and time of viewing. The data on the "content information" contains the details of content, namely, the title, genre, cast, story, year of production, and production staff.

Upon receipt of the input of the operation signal for content output via the input unit 24, the output controller 29 extracts content from the content data storage 30b in accordance with the operation signal, and outputs the extracted content to an output device, such as the display or a speaker. After outputting the content to the output device, the output controller 29 updates the data on the "view log" in the log data.

The user terminal 20 will be hereinafter described as a "recorder." The recorder is a hard disk recorder, a DVD recorder, or the like, which records data, such as a program broadcasted by a broadcasting station (not shown) or the like. In this instance, the user terminal 20 has a connection to a display (not shown) via a transmission line. Under control of the display controller 23, a connected display device provides display of content received from the content server 40. In addition, the user terminal 20, the recorder, includes an input unit, a tuner, an encoder, a data acquisition unit, a controller, a clock, and so on (not shown). The input unit receives the entry of various operation commands from the user. For example, the input unit receives the entry of commands from the user, such as a command to program recording of a program to come on the air and a command to record a program being currently viewed. In accordance with operation from the input unit, the tuner extracts, from a broadcast signal, a broadcast on a selected channel, takes out a video signal and an audio signal, and inputs the signals to the encoder. Upon receipt of the input video and audio signals from the tuner, the encoder compresses or otherwise processes the signals to produce video data and audio data, which in turn are stored in a storage device. The data acquisition unit receives data, such as the program data, which in turn is stored in a storage device. Under the command from the input unit, the controller acquires and stores the program in a storage device at a preselected time, records the program being currently viewed in the storage device, or performs other processing. A tuner-equipped computer, a television with recording capability, or the like may be used as the user terminal 20 in place of the recorder. Any device may be used as the user terminal 20, provided that it can be connected to the network 50 to receive content.

(Recommending Server)

Figure 5:
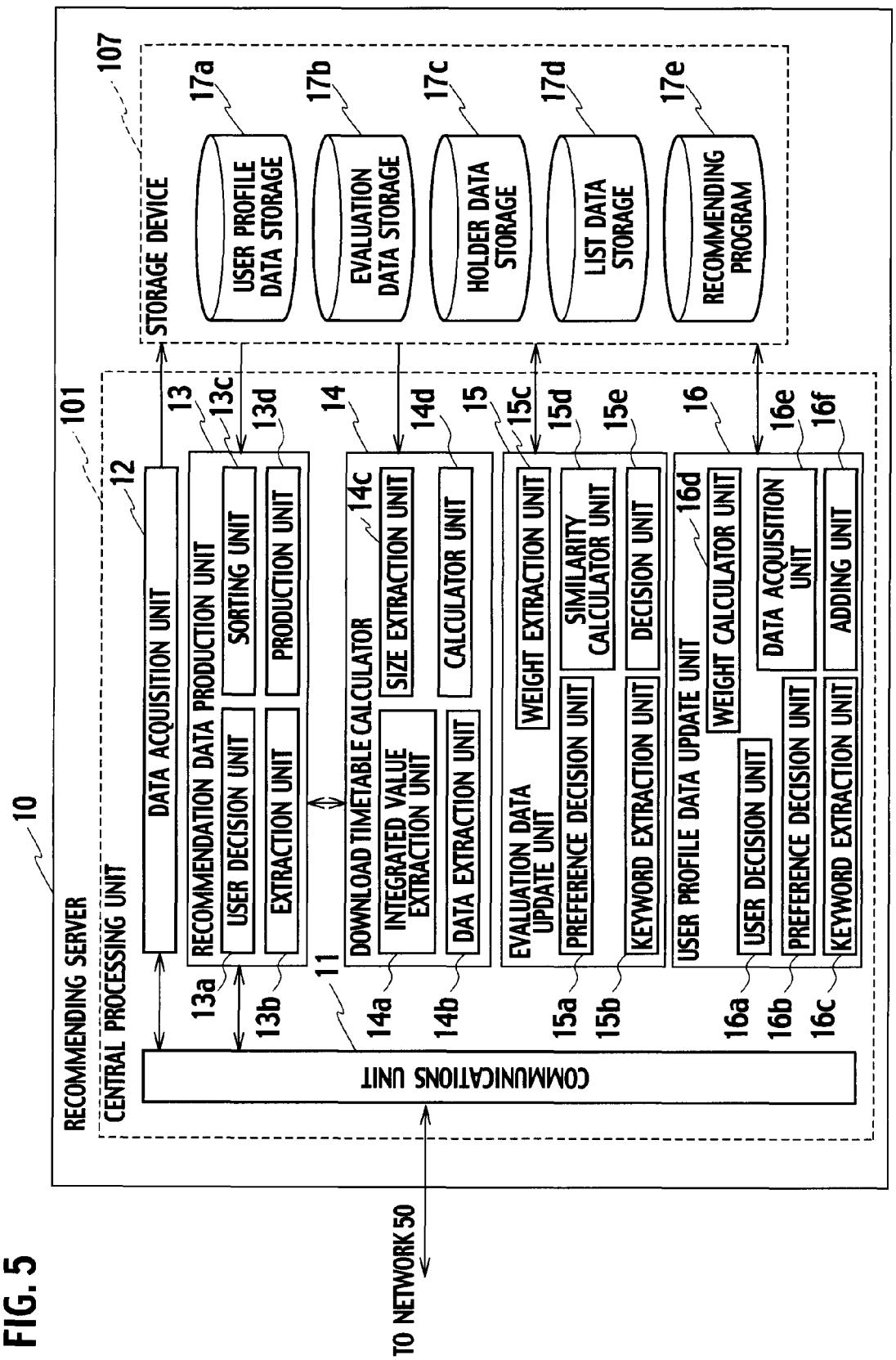
FIG. 5 is a functional block diagram of assistance in explaining the configuration of a recommending server of the recommending system according to the preferred embodiment of the present invention.

As shown in FIG. 5, the recommending server 10 includes a communications unit 11, a data acquisition unit 12, a recommendation data production unit 13, a download timetable calculator 14, an evaluation data update unit 15, and a user profile data update unit 16. As shown in FIG. 5, the recommending server 10 also includes a storage device 107 including a user profile data storage 17a, an evaluation data storage 17b, a holder data storage 17c, and a list data storage 17d.

Figure 6:
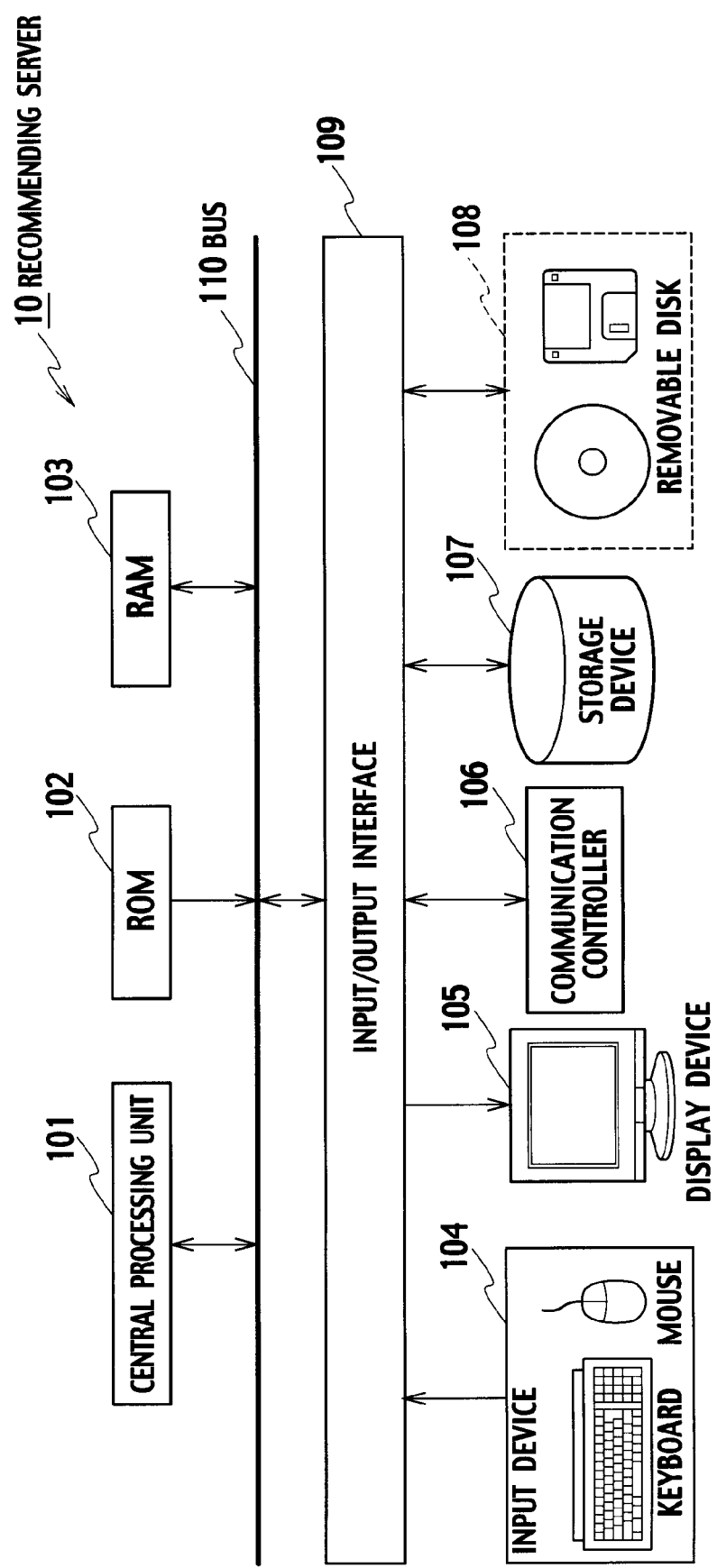
FIG. 6 is a block diagram of assistance in explaining the hardware configuration of the recommending server.

As shown in a diagram of hardware configuration in FIG. 6, the recommending server 10 includes a central processing unit (CPU) 101, a read only memory (ROM) 102, a random access memory (RAM) 103, and an input/output interface 109, which are connected to each other via a bus 110. The input/output interface 109 has connections to an input unit 104, a display device 105, a communication controller 106, a storage device 107, and a removable disk 108.

Under an input signal from the input unit 104, the central processing controller 101 loads a boot program for booting the recommending server 10 from the ROM 102 into execution, and also loads an operating system stored in the storage device 107. Under an input signal from the input unit 104, the communication controller 106, or the like, the central processing unit 101 also controls various devices, and loads a program and data stored in the RAM 103, the storage device 107, or the like into the RAM 103 while performing a series of processing to be described later, such as data calculation or data processing, under a command from the program loaded from the RAM 103.

The input unit 104 is configured of input devices, such as a keyboard and a mouse with which an operator enters various operator commands. Under an operator command, the input unit 104 generates an input signal and transmits the signal to the central processing unit 101 via the input/output interface 109 and the bus 110. The display device 105 is a cathode ray tube (CRT) display, a liquid crystal display, or the like, and the display device 105 provides display of an output signal fed from the central processing unit 101 via the bus 110 and the input/output interface 109.

The communication controller 106 is a LAN card, a modem, or the like, and connects the recommending server 10 that executes a recommender program to a communication network, such as the Internet or a local area network (LAN). The communication controller 106 receives data as an input signal from the communication network, and transmits the input signal to the central processing unit 101 via the input/output interface 109 and the bus 110. The communication controller 106 also receives data as an output signal from the central processing unit 101 via the input/output interface 109 and the bus 110, and transmits the output signal to the communication network.

The storage device 107 is a semiconductor memory unit, a magnetic disk unit, or the like, and stores a program and data to be executed by the central processing unit 101. The removable disk 108 is an optical disk or a flexible disk. Signals read from and written onto the removable disk 108 by a disk drive are transmitted to and received from the central processing unit 101 via the input/output interface 109 and the bus 110. As shown in FIG. 5, the user profile data storage 17a, the evaluation data storage 17b, the holder data storage 17c, and the list data storage 17d form part of the storage device 107 of the recommending server 10.

When the central processing unit 101 loads the recommender program stored in the storage device 107 into execution, the recommending server 10 is configured including the communications unit 11, the data acquisition unit 12, the recommendation data production unit 13, the download timetable calculator 14, the evaluation data update unit 15, and the user profile data update unit 16, as shown in FIG. 5.

The communications unit 11 receives the recommendation request and the log data and others transmitted from the user terminal 20 via the network 50. The communications unit 11 also transmits the recommendation data to the user terminal 20 via the network 50.

The data acquisition unit 12 transmits, via the communications unit 11, the data request to the content server 40 connected to the network 50, and acquires the content-related data. The data acquisition unit 12 also updates the holder data storage 17c and the list data storage 17d, according to the acquired data. The timing of acquisition of the content-related data by the data acquisition unit 12 is, for example, predetermined timing, such as regular timing.

Figure 7:
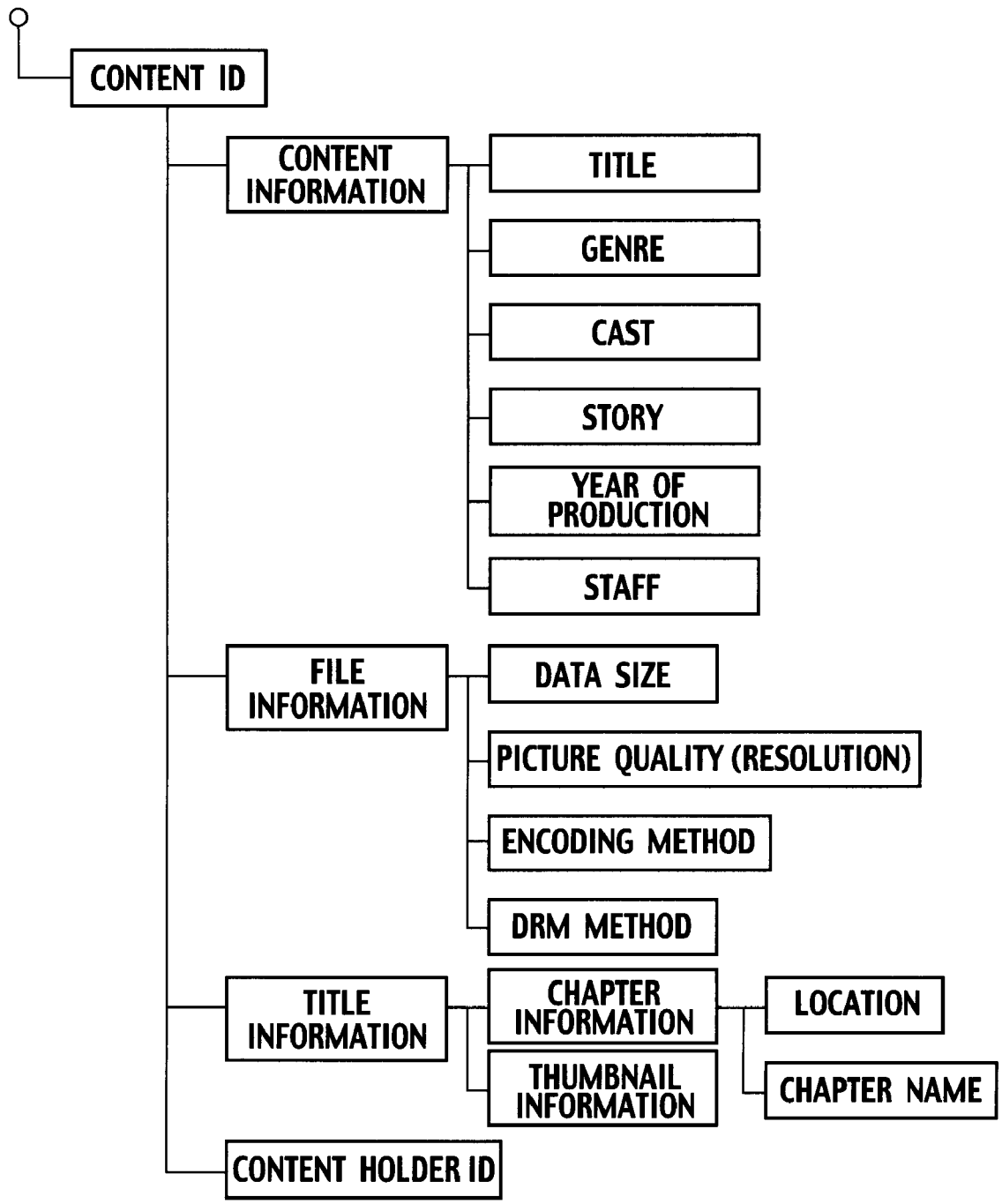
FIG. 7 is a diagram of assistance in explaining an example of content list data for use in the recommending server.

An example of content list data contained in the list data storage 17d will be described with reference to FIG. 7. The content list data shown in FIG. 7 is the data on the content provided by the content server 40, and contains the "content ID" as the key and data on "content information," "file information," "title information" and "content holder ID" in correspondence with the "content ID." The "content information" contains data on the details of the content, such as the title, genre, cast, story, year of production and staff, as in the case of the "content information" described with reference to FIG. 4. The data on the "file information" contains the data size of the content, resolution thereof, an encoding format thereof, and a DRM method therefor. The data on the "title information" contains chapter information indicative of a chapter of the content, and thumbnail information containing an image of a main scene of the content. The "content holder ID" is an identifier of a content holder. The content holder is data on a uniform resource locator (URL) for downloading of the content identified by the content ID, the maximum permissible volume of network traffic, and so on.

Figure 8:
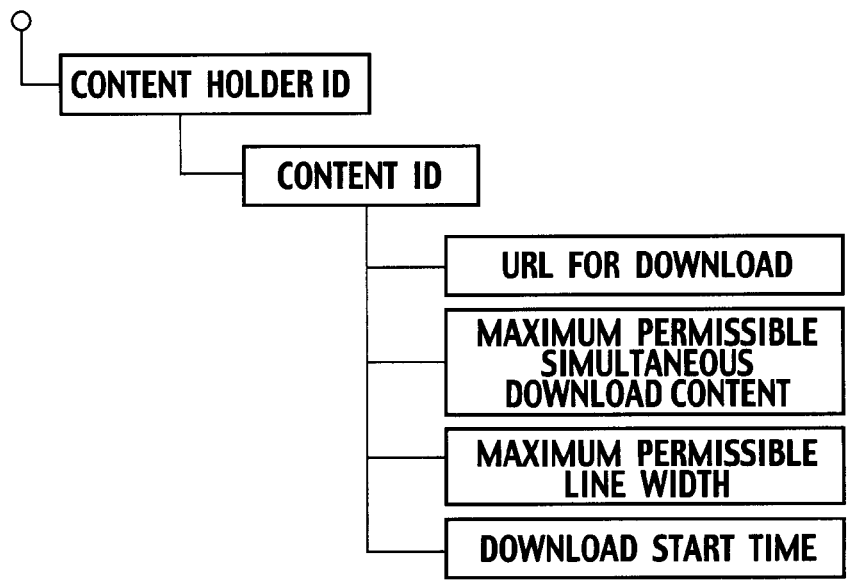
FIG. 8 is a diagram of assistance in explaining an example of content holder data for use in the recommending server.

An example of content holder data contained in the holder data storage 17c will be described with reference to FIG. 8. The content holder data shown in FIG. 8 is the data on downloading of individual pieces of content, and contains the "content holder ID" and the "content ID" as the keys, and data on a "URL for download," a "maximum permissible simultaneous download count," a "maximum permissible line width" and a "download start time" in correspondence with the "content holder ID" and the "content ID."

The "URL for download" is the URL which the user terminal 20 accesses to download the content from the content server 40. The "maximum permissible simultaneous download count" is the maximum number of plural user terminals 20 to which the content can be provided at the same time. The "maximum permissible line width" is the maximum permissible width of a line via which the content server 40 provides the content. The "download start time" is the date and time at which the content server 40 starts providing the content. The content server 40 does not provide all pieces of content at all times but provides the content within a predetermined period of time.

An example of the evaluation data stored in the evaluation data storage 17b will now be described with reference to FIG. 9. The evaluation data is produced and stored at the time when the recommending server 10 acquires new content-related data from the content server 40 and adds the new data to the holder data storage 17c and the list data storage 17d. Storage of the evaluation data will be described later with reference to FIG. 16. The evaluation data is the data produced by predicting the likelihood of the content provided by the content server 40 being downloaded by each individual user terminal 20, from the track record of previous downloading by each individual user terminal 20. The evaluation data storage 17b stores plural items of evaluation data in such a form as is shown in FIG. 9.

Figure 9:
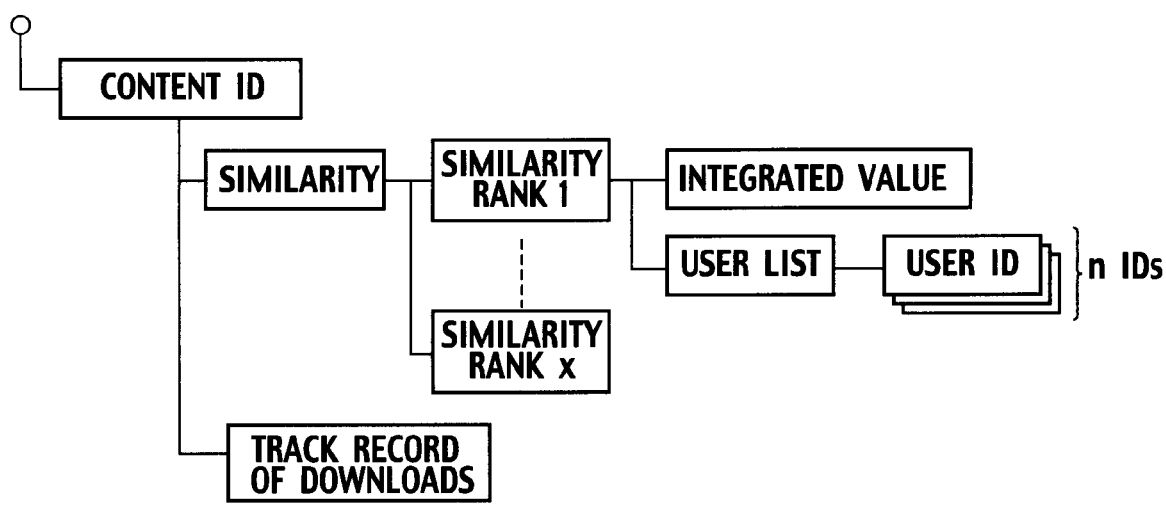
FIG. 9 is a diagram of assistance in explaining an example of evaluation data for use in the recommending server.

The evaluation data shown in FIG. 9 contains the "content ID" as the key, and a "similarity rank" and a "track record of download" in correspondence with the "content ID." The "similarity rank" contains similarity ranks, each of which is in correspondence with an "integrated value" and a "user list." The evaluation data is the data targeted for the content identified by the content ID.

The "similarity rank" is a value representing the similarity between object content and other content, and is determined according to the details of the content, such as the title, the genre, and the cast. The similarity rank shown in FIG. 9 is set by classifying into plural levels of ranks, the degree of similarity determined as the value representing the similarity by using a normal distribution or the like. For example, the degree of similarity determined from two items of content having the same genre and the same cast is higher than the degree of similarity determined from two items of content having the same genre alone. However, content items, even if being of different degrees of similarity, can possibly be classified as the same level of similarity rank. The similarity rank is set according to the degree of similarity as mentioned above in order that the levels of ranks are in correspondence with the substantially uniform number of user IDs.

An example of calculation of the degree of similarity will be described later with reference to Equation (6). The "integrated value" is the total number of previous occasions of downloading, by the user terminals 20, of content belonging to the "similarity rank" in correspondence with the similarity to the object content. At this point, the similarity ranks are in correspondence with a substantially uniform integrated value, since the similarity rank is set so that the similarity ranks are in correspondence with the substantially uniform number of user IDs. The "user list" is in correspondence with a list of the user IDs identifying the user terminals 20 that have downloaded the content belonging to the "similarity rank" in correspondence with the similarity to the object content.

In the example of the evaluation data shown in FIG. 9, similarity ranks 1 to x are each in correspondence with the integrated value and the user list, and the number of user IDs in correspondence with the similarity rank 1 is n. In other words, this indicates that content belonging to the "similarity rank 1" in relation to the similarity to the object content has been previously downloaded by n user terminals 20. In other words, the integrated value in correspondence with the similarity rank 1 shown in FIG. 9 is n.

The "track record of download" is the total number of previous occasions of downloading of content similar to the object content. As employed for example in the evaluation data shown in FIG. 9, the "track record of download" is the total number of previous occasions of downloading of content items belonging to the similarity ranks 1 to x in relation to the object content. The track record of download is the sum total of the integrated values in correspondence with the similarity ranks. The track record of download having a large value indicates that the content similar to the object content has been downloaded by many users, and hence indicates that the download count of the object content is expected to rise.

Figure 10:
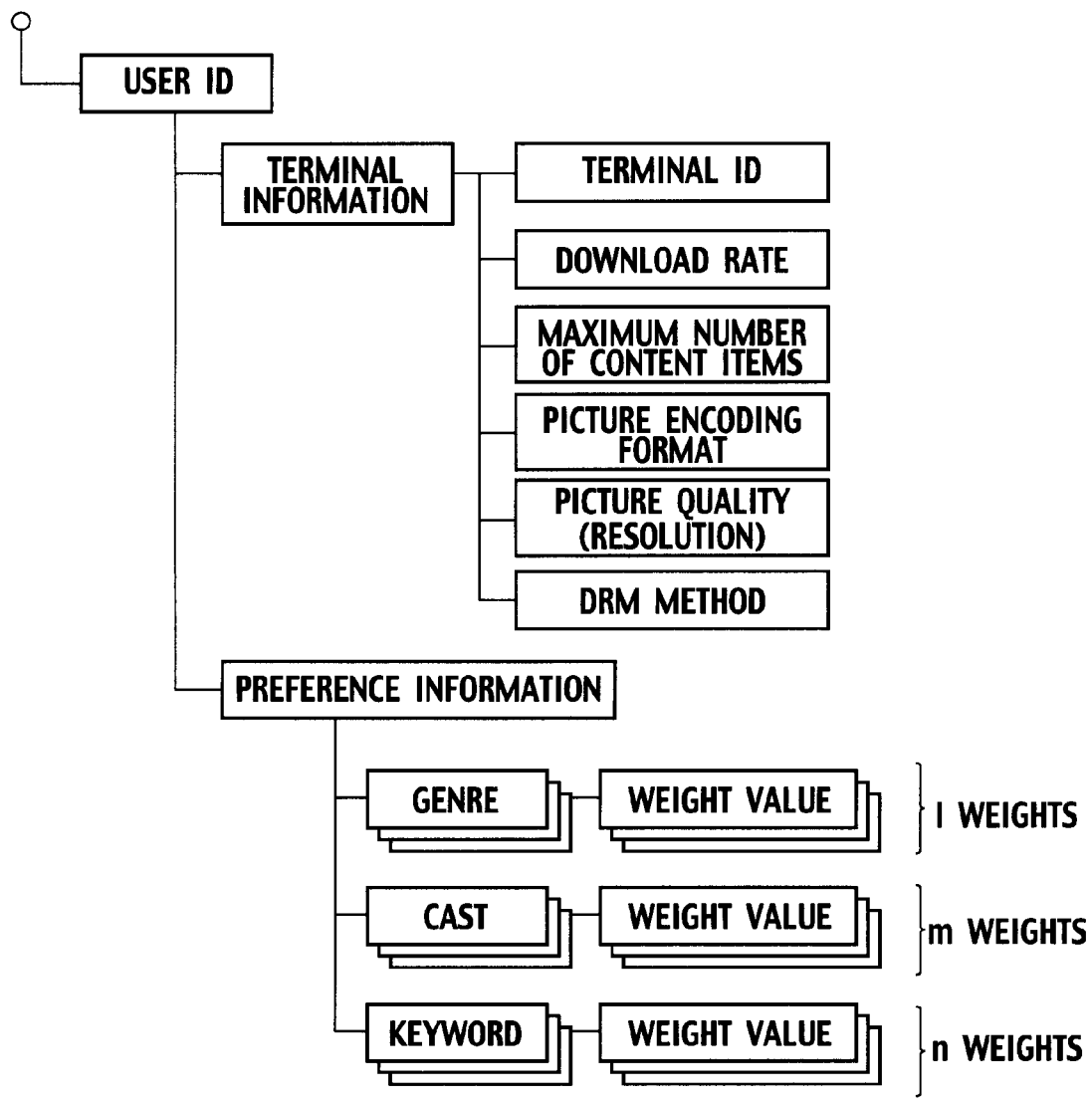
FIG. 10 is a diagram of assistance in explaining an example of user profile data for use in the recommending server.

An example of the user profile data stored in the user profile data storage 17a will be described with reference to FIG. 10. The user profile data shown in FIG. 10 contains the "user ID" as the key, and "terminal information" and "preference information" in correspondence with the "user ID." The "terminal information" contains a terminal ID, a download rate, the maximum number of content items, a picture encoding format, picture quality, and a DRM method. The terminal ID is an identifier unique to hardware that is the terminal, and corresponds to, for example, a media access control (MAC) address assigned to a network interface card, or the like.

The download rate is a communication rate at which the user terminal 20 downloads the content from the content server 40, and is determined by a communication line used by the user terminal 20, or the like. The maximum number of content items is the maximum number of content items that can be downloaded by the user terminal 20, and is determined by the capacity of the content data storage 30b. For example, assume a case where the content data storage 30b has a capacity of 100 gigabytes, 60 gigabytes of storage are already used, and 40 gigabytes thereof are left. In such a case, the maximum number of content items is 10 as of this point in time if two-hour content is of a size of an average of 4 gigabytes per content.

The picture encoding format is the format that can be encoded by the user terminal 20. The picture quality is resolution that can be handled by the user terminal 20. The DRM method is the method for digital rights management (DRM) used by the user terminal 20. The "preference information" contains weight values for the genre, the cast, and a keyword, which represent the details of the content. When content is downloaded by the user terminal 20, a new weight value in correspondence with the genre, the cast, or the keyword, which represents the details of the downloaded content, is calculated and stored in the user profile data storage 17a. In the example shown in FIG. 10, the number of weight values for the genre is 1, the number of weight values for the cast is m, and the number of weight values for the keyword is n. However, when content containing a new genre, cast, or keyword is downloaded, the number of weight values in correspondence with the genre, the cast, or the keyword is changed. Larger weight value represents stronger preferences of the user terminal 20 (or user's stronger preferences).

The recommendation data production unit 13 produces the recommendation data in response to the recommendation request inputted from the user terminal 20 via the communications unit 11. As shown in FIG. 5, the recommendation data production unit 13 includes a user decision unit 13a, an extraction unit 13b, a sorting unit 13c, and a production unit 13d.

The user decision unit 13a determines whether or not the user ID contained in the input recommendation request matches the user ID contained in the evaluation data described above with reference to FIG. 9.

When the user ID contained in the input recommendation request matches the user ID contained in the evaluation data stored in the evaluation data storage 17b, the extraction unit 13b extracts the similarity rank in correspondence with the user ID and the content ID in the evaluation data, and places the content ID and the similarity rank in correspondence with each other in the memory, which in turn are stored in the memory.

The sorting unit 13c sorts plural sets of content IDs and similarity ranks stored in the memory in descending order of similarity rank. The sorting unit 13c may erase from the memory sets of content IDs and similarity ranks after a predetermined position in the sorting order so as to limit the number of content IDs contained in the recommendation data.

The production unit 13d reads out from the memory the plural sets of content IDs and similarity ranks sorted by the sorting unit 13c. Moreover, the production unit 13d causes the download timetable calculator 14 to calculate subscription times for downloading of individual pieces of content, reads out from the list data storage 17d list data items identified by the content IDs read out from the memory, and brings the subscription times into correspondence with the list data items, respectively, to thereby produce the recommendation data. The production unit 13d outputs the produced recommendation data to the communications unit 11, which in turn transmits the recommendation data to the user terminal 20 via the network 50.

Figure 11:
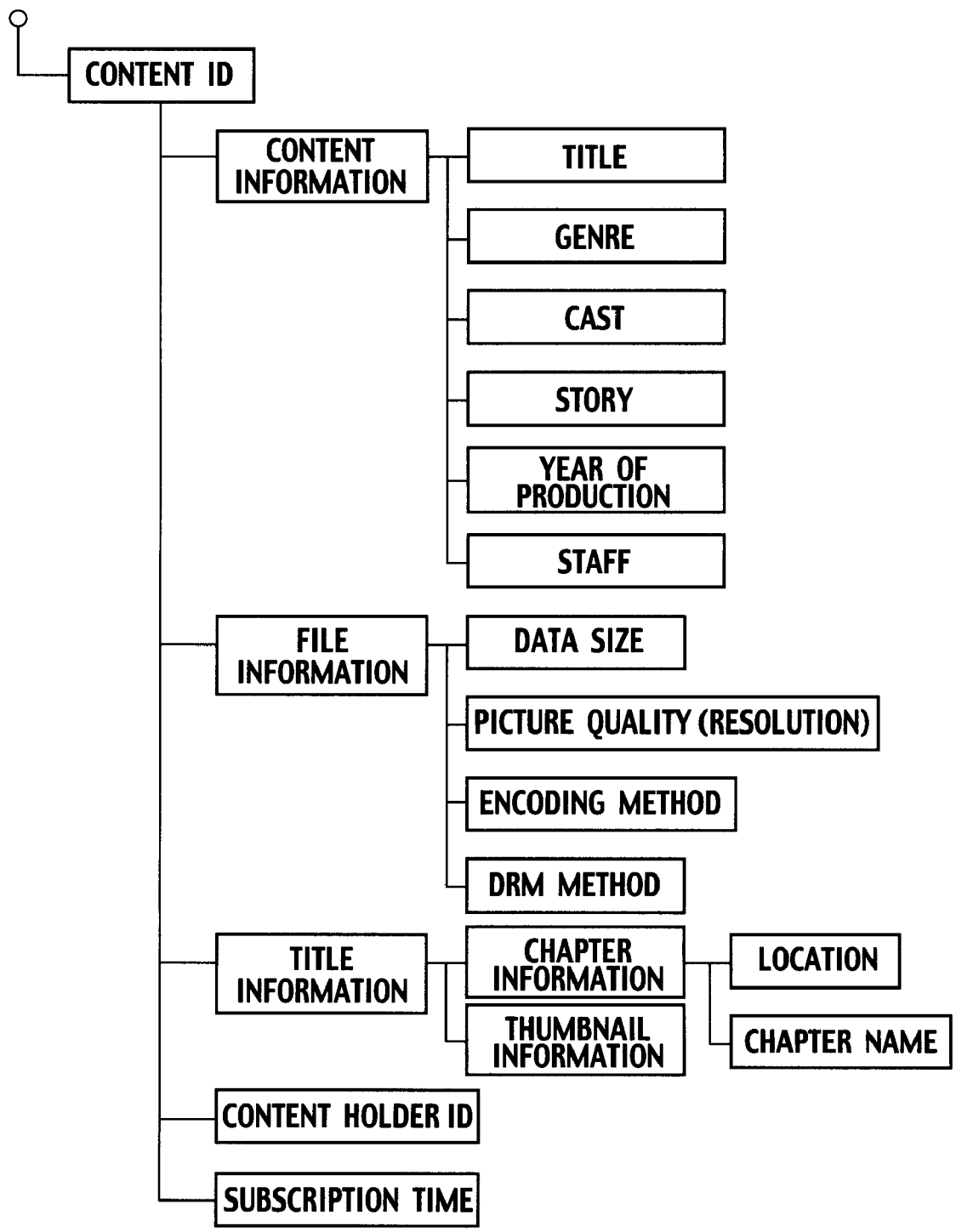
FIG. 11 is a diagram of assistance in explaining an example of content recommendation data produced by the recommending server.

An example of the recommendation data produced by the production unit 13d will be described with reference to FIG. 11. The recommendation data contains the "content ID" as the key, and the "content information," the "file information," the "title information," the "content holder ID" and the "subscription time" in correspondence with the "content ID." The data from the "content information" to the "content holder ID" is the data contained in the content list data stored in the list data storage 17d described with reference to FIG. 7. The recommendation data contains the "subscription time" calculated by the download timetable calculator 14 in correspondence with the "content ID," in addition to the content list data contained in the list data storage 17d. The "subscription time" is the time at which the user terminal 20 is permitted to download the content from the content server 40. The user terminal 20 can download the content from the content server 40 at a time determined by the subscription time. The production unit 13*d* produces the data in a form shown in FIG. 11 for individual pieces of content, and transmits a set of these plural data items as the recommendation data to the user terminal 20.

The download timetable calculator 14 extracts the subscription time at which the user terminal 20 can do downloading, according to an input from the recommendation data production unit 13. As shown in FIG. 5, the download timetable calculator 14 includes an integrated value extraction unit 14*a*, a data extraction unit 14*b*, a size extraction unit 14*c*, and a calculator unit 14*d*.

The integrated value extraction unit 14*a* extracts an integrated value Sj in correspondence with the content ID, the user ID, and the similarity rank, which are targeted for calculation of the subscription time, from the evaluation data stored in the evaluation data storage 17*b*.

The data extraction unit 14*b* extracts the content-related data, namely, a maximum permissible simultaneous download count Dm, a maximum permissible line count Bm and a download start time Ts in correspondence with the content ID targeted for the calculation of the subscription time, from the content holder data stored in the holder data storage 17*c*.

The size extraction unit 14*c* extracts a data size Z in correspondence with the content ID targeted for the calculation of the subscription time from the content list data stored in the list data storage 17*d*.

Then, the calculator unit 14*d* calculates a subscription time Tc for example by using Equations (1) to (4), according to the integrated value Sj, the maximum permissible simultaneous download count Dm, the maximum permissible line count Bm, the download start time Ts and the data size Z extracted by the extraction units 14*a* to 14*c*, and a maximum download delay time Tm. As employed herein, the maximum download delay time Tm refers to, for example, a constant indicating that downloading is permitted for two days (or 48 hours) since the date and time of start of first downloading of object content, that is, a time limit on download.

To calculate the subscription time Tc, the calculator unit 14*d* first determines whether or not the following equation is satisfied: $(\Sigma Sj) \leq (Bm \cdot Tm)/Dm \cdot Z)$.

When the above equation, $(\Sigma Sj) \leq (Bm \cdot Tm)/(Dm \cdot Z)$, is satisfied or equivalently when the integrated value is sufficiently smaller than the maximum permissible download count, the calculator unit 14*d* determines the subscription time Tc of content for a user belonging to a similarity rank j, by using Equation (1):

$$Tc = Ts + \Sigma\{Si \cdot (Dm \cdot Z)/Bm\} + \Delta t \ (1 \leq i \leq (j-1)) \quad (1)$$

where $\Delta t$ represents a delay time for a user ID belonging to the similarity rank j and takes on numeric values within a range represented by Equation (2), and n denotes random numbers within the above range.

$$\Delta t = n \cdot (Dm \cdot Z)/Bm \ (\text{where } 0 \leq n \leq Sj) \quad (2)$$

When the above equation is not satisfied (or $(\Sigma Sj) > (Bm \cdot Tm)/(Dm \cdot Z)$), or equivalently when the integrated value is larger than the maximum permissible download count, it is required that one downloading be permitted to somewhat overlap another. Thus, the calculator unit 14*d* determines the subscription time Tc of the content for the user belonging to the similarity rank j by using Equation (3):

$$Tc = Ts + [Si\{(Dm \cdot Z/Bm) - \omega\}] + \Delta t \ (1 \leq i \leq (j-1)) \quad (3)$$

where $\Delta t$ represents the delay time for the user ID belonging to the similarity rank j and takes on numeric values within a range represented by Equation (4), n denotes random numbers within the above range, and $\omega$ denotes an overlap time (or the time of overlap between previous downloading and subsequent downloading) and is represented by Equation (5).

$$\Delta t = n \cdot \{(Dm \cdot Z/Bm) - \omega\}(\text{where } 0 \leq n \leq Sj) \quad (4)$$

$$\omega = Dm \cdot Z/Bm - Tm/\Sigma Si \ (1 \leq i \leq (j-1)) \quad (5)$$

The evaluation data update unit 15 produces the evaluation data and stores the evaluation data in the evaluation data storage 17*b*, at the time when the data acquisition unit 12 acquires new content-related data from the content server 40 and updates the content holder data stored in the holder data storage 17*c* and the content list data stored in the list data storage 17*d*. As shown in FIG. 5, the evaluation data update unit 15 includes a preference decision unit 15*a*, a keyword extraction unit 15*b*, a weight extraction unit 15*c*, a similarity calculator unit 15*d*, and a decision unit 15*e*.

The preference decision unit 15*a* determines whether or not the details of content newly added match the preferences in content downloaded by the user terminal 20. Specifically, the preference decision unit 15*a* determines whether or not the genre in correspondence with each user ID in the user profile data stored in the user profile data storage 17*a* matches the genre of the content newly added. The preference decision unit 15*a* also determines whether or not the cast in correspondence with each user ID in the user profile data stored in the user profile data storage 17*a* matches the cast of the content newly added. The preference decision unit 15*a* further determines whether or not the keyword in the user profile data stored in the user profile data storage 17*a* matches a keyword in the newly added content extracted by the keyword extraction unit 15*b*. The preference decision unit 15*a* can use, for example, "exact string matching" or the like to determine a match.

The keyword extraction unit 15*b* extracts the keyword from a character string, such as the title and the story, in content list data newly added to the list data storage 17*d*. The keyword is extracted from the content-related data, such as the title, as mentioned above so that the preference decision unit 15*a* can use the keyword to determine the user's preferences. The keyword extraction unit 15*b* uses, for example, "morphological analysis" as a keyword extraction method.

When the preference decision unit 15*a* determines that a genre match exists, the weight extraction unit 15*c* extracts a weight value Wg in correspondence with the pertinent user ID and genre in the user profile data. When the preference decision unit 15*a* determines that a cast match exists, the weight extraction unit 15*c* also extracts a weight value Wt in correspondence with the pertinent user ID and cast in the user profile data. When the preference decision unit 15*a* determines that a keyword match exists, the weight extraction unit 15*c* further extracts a weight value Wk in correspondence with the pertinent user ID and keyword in the user profile data.

The similarity calculator unit 15*d* calculates degree of similarity, according to the weight values extracted by the weight extraction unit 15*c*. A weighted mean formula or the like, for example, is used as a method for calculating degree of similarity S. As an example of the similarity calculation method, the degree of similarity can be determined by Equation (6):

$$S = Wg \times Kg + Wt \times Kt + Wk \times Kk \quad (6)$$

where Kg, Kt and Kk denote factors determined for the weight values Wg, Wt and Wk, respectively.

The decision unit 15e determines the similarity rank according to the degree of similarity S calculated by the similarity calculator unit 15d. The decision unit 15e uses, for example, a normal distribution to determine the similarity rank. When the decision unit 15e determines from the calculated degree of similarity that the similarity rank is the "similarity rank j" the decision unit 15e increments by 1 the "integrated value" in correspondence with the "similarity rank J" targeted for the evaluation data, and adds the target "user ID."

When the communications unit 11 receives an input of the log data transmitted from the user terminal 20 via the network 50, the user profile data update unit 16 updates the user profile data storage 17a. As shown in FIG. 5, the user profile data update unit 16 includes a user decision unit 16a, a preference decision unit 16b, a keyword extraction unit 16c, a weight calculator unit 16d, a data acquisition unit 16e, and an adding unit 16f.

Upon receipt of an input of the user ID in conjunction with the log data, the user decision unit 16a determines whether or not the input user ID is contained in the user profile data in the user profile data storage 17a.

When the user decision unit 16a determines that the input user ID is contained in the user profile data in the user profile data storage 17a, the preference decision unit 16b determines whether or not the preference information contained in the user profile data in the user profile data storage 17a matches the content information (or user's preferences) contained in the log data. Specifically, the preference decision unit 16b determines whether or not the genre in correspondence with the preference information in the input log data matches the genre in correspondence with the pertinent user ID in the user profile data storage 17a. The preference decision unit 16b also determines whether or not the cast in correspondence with the preference information in the input log data matches the cast in correspondence with the pertinent user ID in the user profile data storage 17a. The preference decision unit 16b further determines whether or not a keyword extracted by the keyword extraction unit 16c in the content information contained in the input log data matches the keyword in correspondence with the pertinent user ID in the user profile data storage 17a.

When the preference decision unit 16b determines that a preference match exists, the weight calculator unit 16d calculates a weight value and updates the weight value in the user profile data stored in the user profile data storage 17a by the new calculated weight value. Specifically, when the preference decision unit 16b determines that a genre match exists, the weight calculator unit 16d calculates a weight value in correspondence with the input user ID and pertinent genre in the user profile data storage 17a, and updates the weight value in correspondence with the genre in the user profile data by the new calculated weight value. When the preference decision unit 16b determines that a cast match exists, the weight calculator unit 16d also calculates a weight value in correspondence with the input user ID and pertinent cast in the user profile data storage 17a, and updates the weight value in correspondence with the cast in the user profile data by the new calculated weight value. When the preference decision unit 16b determines that a keyword match exists, the weight calculator unit 16d further calculates a weight value in correspondence with the input user ID and pertinent keyword in the user profile data storage 17a, and updates the weight value in correspondence with the keyword in the user profile data by the calculated weight value.

When the user decision unit 16a determines that the input user ID is not contained in the user profile data stored in the user profile data storage 17a, the data acquisition unit 16e sends a terminal data request to the user terminal 20 identified by the terminal ID inputted via the communications unit 11. The "terminal data request" requests the user terminal 20 to transmit the terminal data stored in the storage device.

Upon receipt of the terminal data from the user terminal 20 in response to the terminal data request from the data acquisition unit 16e, the adding unit 16f produces user profile data in correspondence with the user ID that identifies the user terminal 20 and the terminal data, and adds the user profile data to the user profile data storage 17a, which in turn stores the user profile data.

Incidentally, one computer as shown in FIG. 6 or plural computers capable of communications with each other may be used to execute the function of the recommending server 10 according to the embodiment of the present invention.

(Production Processing and Transmission Processing for Recommendation Data)

Description will be given with reference to a flowchart shown in FIG. 12 with regard to production processing and transmission processing for recommendation data at steps S4 and S5 in FIG. 2, which are executed by the recommending server 10.

When the communications unit 11 of the recommending server 10 receives the recommendation request from the user terminal 20 (YES at step S101), the user decision unit 13a determines whether or not the user ID contained in the received recommendation request is contained in the user profile data stored in the user profile data storage 17a (at step S102).

When the user ID contained in the received recommendation request is judged as being the user ID contained in the user profile data stored in the user profile data storage 17a (YES at step S102), the user decision unit 13a determines whether or not the user ID contained in the recommendation request received at step S101 matches the user ID contained in the evaluation data stored in the evaluation data storage 17b (at steps S103 and S104).

When a user ID match exists (YES at step S104), the extraction unit 13b extracts the object content ID and the similarity rank in correspondence with the content ID in the evaluation data, and places the content ID and the similarity rank in the memory, which are in turn stored in the memory (at step S105).

Processing at steps S104 and S105 is repeated for the content IDs in correspondence with all evaluation data stored in the evaluation data storage 17b (at step S103).

When the processing at steps S104 and S105 is completed for the content in correspondence with all evaluation data stored in the evaluation data storage 17b, the sorting unit 13c sorts the content IDs stored in the memory at step S105, in descending order of similarity ranks in correspondence with the content IDs, and places the content IDs in the memory, which in turn stores the content IDs (at step S106).

Then, the sorting unit 13c cuts the content IDs sorted at step S106 to a predetermined number (at step S107). For example, when the predetermined number is "32," the 33rd set and sets thereafter are erased from the memory in a case where the number of sets of content IDs and similarity ranks stored in the memory is greater than 32.

Then, the recommendation data production unit 13 causes the download timetable calculator 14 to calculate the subscription time Tc of the content of each content ID (at step S108). Description will be given later with reference to a flowchart shown in FIG. 14 with regard to calculation of the subscription time Tc by the download timetable calculator 14.

Upon receipt of an input of the subscription time Tc calculated by the download timetable calculator 14 at step S108, the production unit 13d produces the recommendation data containing the calculated subscription time Tc (at step S109).

Then, the communications unit 11 transmits, to the user terminal 20, the recommendation data produced by the recommendation data production unit 13, and processing is brought to an end (at step S110).

Figure 13:
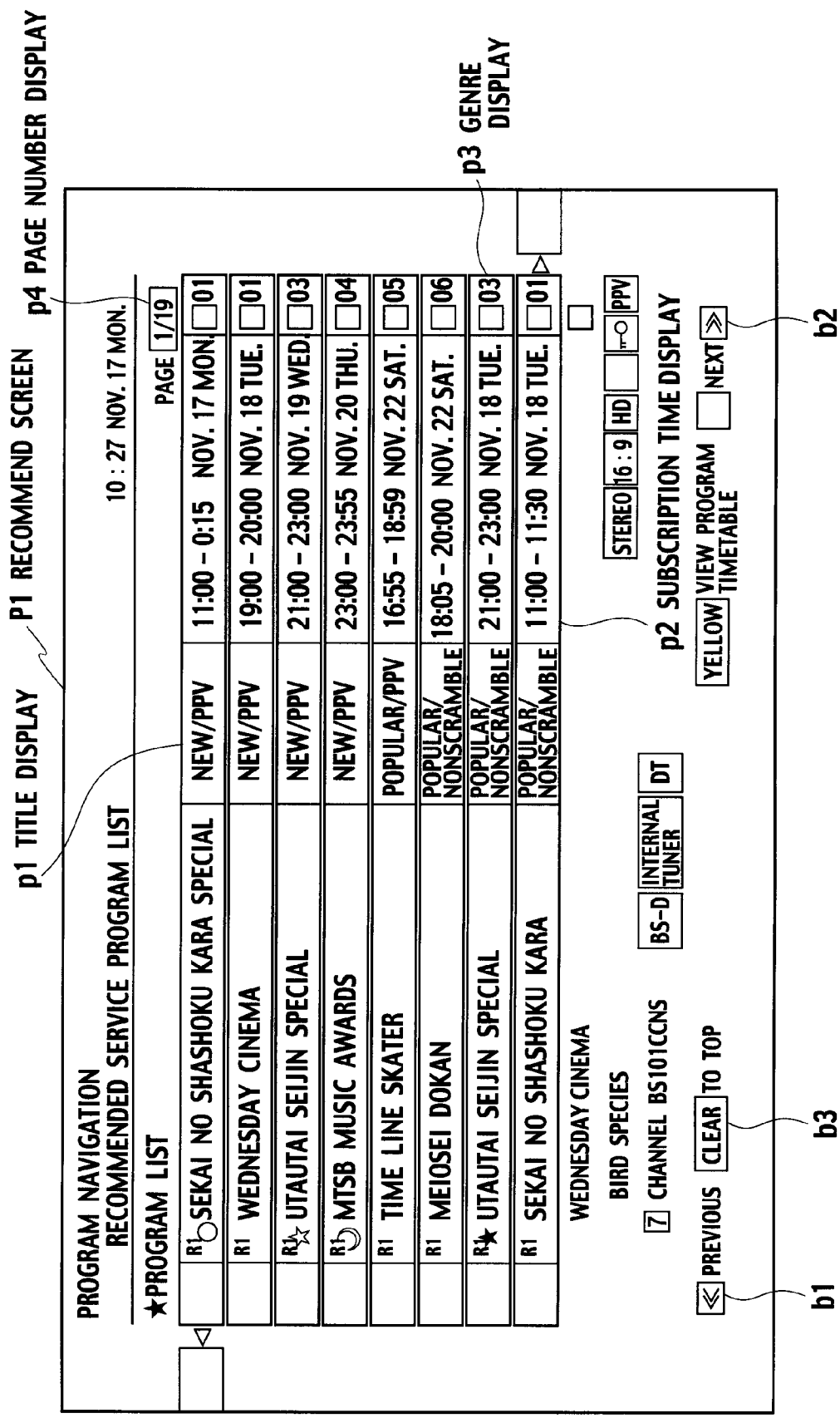
FIG. 13 is an illustration of an example of a recommend screen displayed by the user terminal.

When the user terminal 20 receives the recommendation data transmitted by the recommending server 10, a recommend screen P1 appears on the display connected to the user terminal 20, according to the recommendation data, as shown in FIG. 13. The recommend screen P1 includes a title display p1 that displays the titles of individual pieces of content contained in the recommendation data, a subscription time display p2 that displays the subscription times, a genre display p3 that displays the genres, and so on. The recommend screen P1 also includes screen select buttons b1 and b2 for displaying a previous screen and a next screen, respectively, when the content contained in the recommendation data cannot be displayed on one screen, a top screen operation button b3 for displaying the top screen, a page display p4 that displays a page number of the displayed screen of all display screens, and so on.

(Calculation Processing for Subscription Time)

Figure 14:
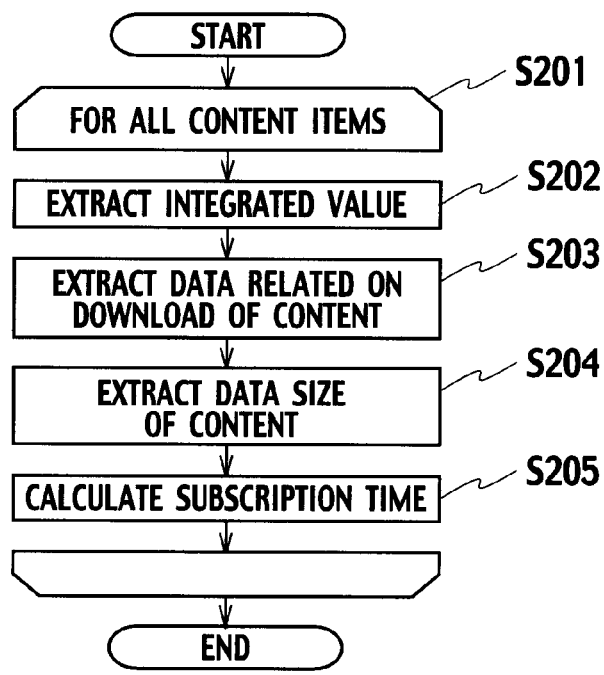
FIG. 14 is a flowchart of assistance in explaining calculation processing for a subscription time, which is executed by the recommending server.

Description will be given with reference to the flowchart shown in FIG. 14 with regard to calculation processing for the subscription time Tc at step S108 in FIG. 12, which is executed by the download timetable calculator 14.

Figure 12:
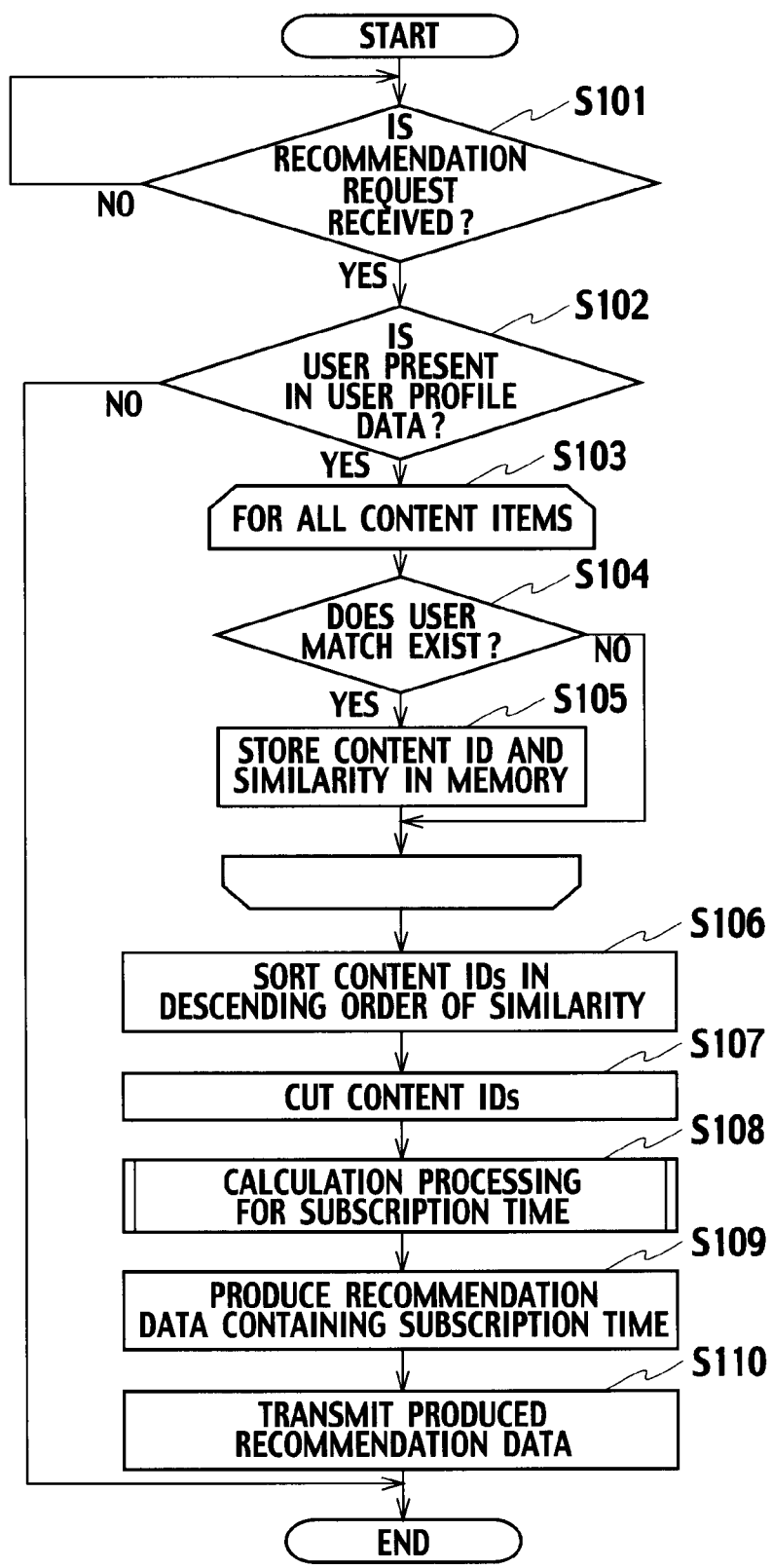
FIG. 12 is a flowchart of assistance in explaining processing for production and transmission of content recommendation data, which are executed by the recommending server.

First, the integrated value extraction unit 14a extracts the integrated value Sj in correspondence with the user ID received at step S101 in FIG. 12 and the content ID and the similarity rank stored in the memory at step S106 from the evaluation data stored in the evaluation data storage 17b, for each individual piece of content (at steps S201 and S202).

Then, the data extraction unit 14b extracts the data on downloading of the content, namely, the maximum permissible simultaneous download count Dm, the maximum permissible line count Bm and the download start time Ts in correspondence with the target content ID, from the content holder data stored in the holder data storage 17c (at step S203).

Subsequently, the size extraction unit 14c extracts the data size in correspondence with the target content ID from the content list data stored in the list data storage 17d (at step S204). Then, the calculator unit 14d calculates the subscription time Tc, for example, by using the above Equations (1) to (4).

Processing at steps S202 to S205 is repeated until the subscription times Tc are calculated for the content items identified by all content IDs stored in the memory at the time of step S107 shown in FIG. 12. Then, the calculator unit 14d outputs the calculated download time to the recommendation data production unit 13, and the calculation processing is brought to an end (at step S205).

(Subscription Processing by User Terminal)

Figure 15:
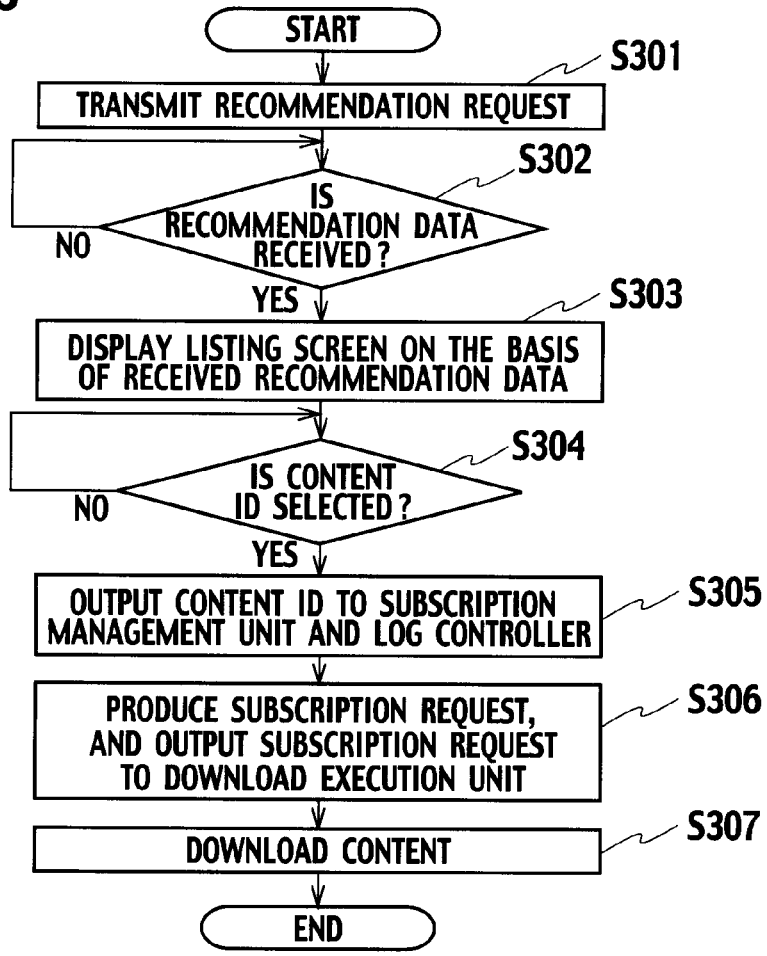
FIG. 15 is a flowchart of assistance in explaining subscription processing by the user terminal.

Description will be given with regard to subscription processing at step S7 in FIG. 2 with reference to a flowchart shown in FIG. 15.

First, the user terminal 20 sends the recommendation request to the recommending server 10 via the communications unit 21 (at step S301), and waits for the receipt of the recommendation data which the recommending server 10 transmits in response to the sent recommendation request (at step S302).

When the communications unit 21 receives the recommendation data transmitted from the recommending server 10 (YES at step S302), the recommend screen P1 appears on the display, according to the received recommendation data, under control of the display controller 23 (at step S303). At this point, the recommend screen P1 on the display is the recommend screen P1 described above with reference to FIG. 13.

When the recommend screen P1 appears on the display under control of the display controller 23, the input unit 24 waits for selection of the content ID (at step S304). The content ID is selected from among the content IDs contained in the recommend screen P1 on the display by the user via the input device.

When the content ID is selected (YES at step S304), the input unit 24 outputs download-related data, such as the selected content ID, the subscription time, and the URL for download, to the subscription management unit 25 (at step S305). At this time, the input unit 24 also outputs data, such as the selected content ID and the content information, to the log controller 28.

Upon receipt of an input of the content ID, the subscription management unit 25 produces a subscription request and outputs the produced subscription request to the download unit 26 (at step S306). Specifically, the subscription management unit 25 extracts the subscription time Tc in correspondence with the content ID selected at step S304 from the recommendation data received from the recommending server 10 at step S302, produces the subscription request in correspondence with the content ID and the subscription time Tc, and outputs the subscription request to the download unit 26. For example, when the subscription time Tc is "14:00 on May 22, 2006," the subscription request requests the download unit 26 to download the content identified by the "content ID" designated at "14:00 on May 22, 2006."

The download unit 26 downloads the content from the content server 40 at the subscription time according to the subscription request from the subscription management unit 25 (at step S307). The download unit 26 sends the content request containing the URL for download and the user ID to the content server 40 via the communications unit 21, receives the content from the content server 40 in response to the sent content request, and thereby downloads the content.

Upon receipt of an input of the content ID from the input unit 24 at step S305, the log controller 28 places the log data containing the content information in correspondence with the input content ID in the log data storage 30a, which in turn stores the log data. For example, when the content ID is "A001," the log data containing information on whether or not downloading of the content identified by "A001" has been subscribed to, information on whether or not the content has been viewed, the "title information" of the content, the "genre" of the content, the "cast" of the content, and so on is stored in the log data storage 30a, according to the recommendation data which the communications unit 21 receives from the recommending server 10 at step S302.

(Update Processing for Evaluation Data)

Figure 16:
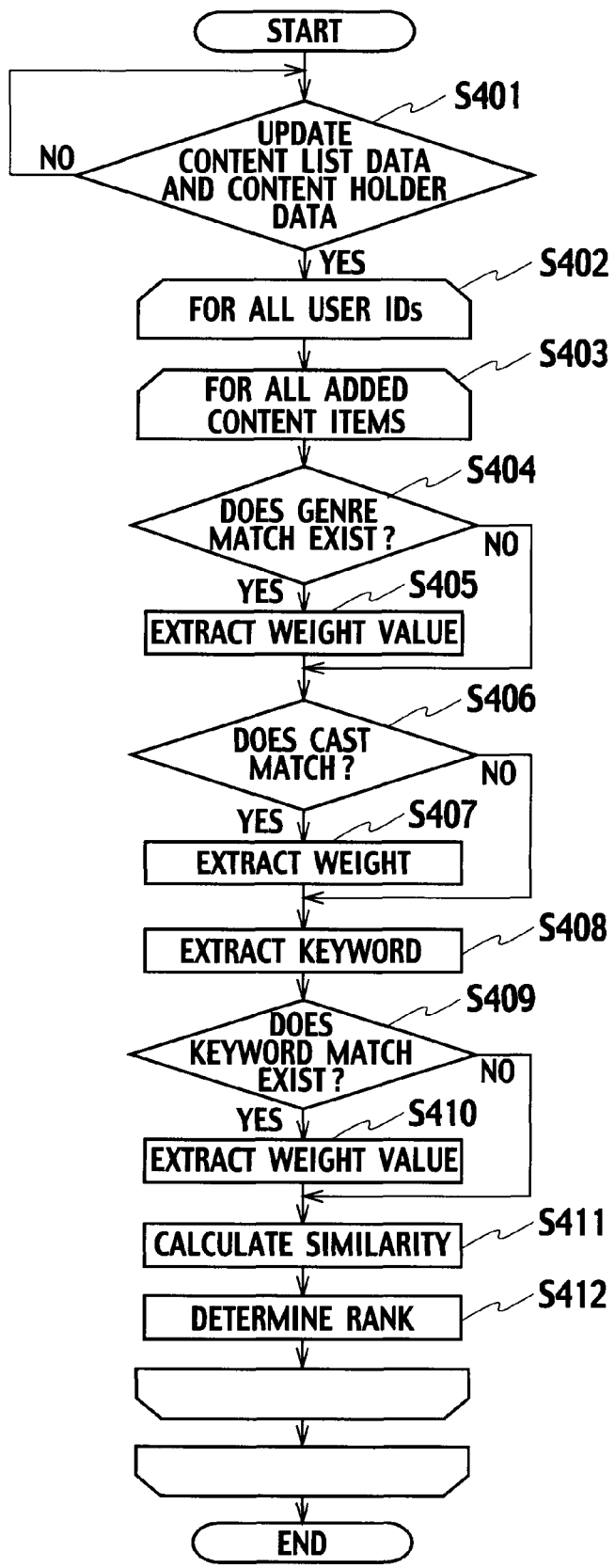
FIG. 16 is a flowchart of assistance in explaining update processing for evaluation data, which is executed by the recommending server.

Description will be given with regard to update processing for evaluation data at step S3 in FIG. 2 with reference to a flowchart shown in FIG. 16. The evaluation data is updated at the time when the recommending server 10 acquires new content-related data from the content server 40 and then adds new content list data to the list data storage 17d.

When the data acquisition unit 12 acquires new content-related data from the content server 40 and stores "content list data" and "content holder data" in the list data storage 17d and the holder data storage 17c, respectively (YES at step S401), the preference decision unit 15a determines whether or not the genre in correspondence with the user ID in one item of user profile data stored in the user profile data storage 17a matches the genre in correspondence with the content ID contained in one item of added content list data (at step S404). When the preference decision unit 15a determines that a genre match exists (YES at step S404), the weight extraction unit 15c extracts the weight value Wg in correspondence with the pertinent genre in the targeted user profile data (at step S405).

Then, the preference decision unit 15a determines whether or not the cast contained in the user profile data targeted at step S404 matches the cast contained in the content list data (at step S406). When the preference decision unit 15a determines that a cast match exists (YES at step S406), the weight extraction unit 15c extracts the weight value Wt in correspondence with the pertinent cast in the targeted user profile data (at step S407).

Then, the keyword extraction unit 15b extracts the keyword from the character string of the title or the story contained in the content list data (at step S408).

Then, the preference decision unit 15a determines whether or not the keyword contained in the user profile data targeted at step S404 matches the keyword extracted at step S408 (at step S409). When the preference decision unit 15a determines that a keyword match exists (YES at step S409), the weight extraction unit 15c extracts the weight value Wk in correspondence with the pertinent keyword in the targeted user profile data (at step S410).

Then, the similarity calculator unit 15d calculates the degree of similarity S according to the weight values Wg, Wt and Wk extracted by the weight extraction unit 15c at steps S405, S407 and S410, respectively (at step S411).

When the degree of similarity S is calculated at step S411, the decision unit 15e determines the rank of the calculated similarity S from similarity ranks 1 to n, and places updated evaluation data containing the new similarity S and rank in the evaluation data storage 17b, which in turn stores the evaluation data (at step S412).

Processing at steps S404 to S412 is repeatedly performed on all newly added content at step S401 (at step S403).

(Updating of User Profile Data)

Figure 17:
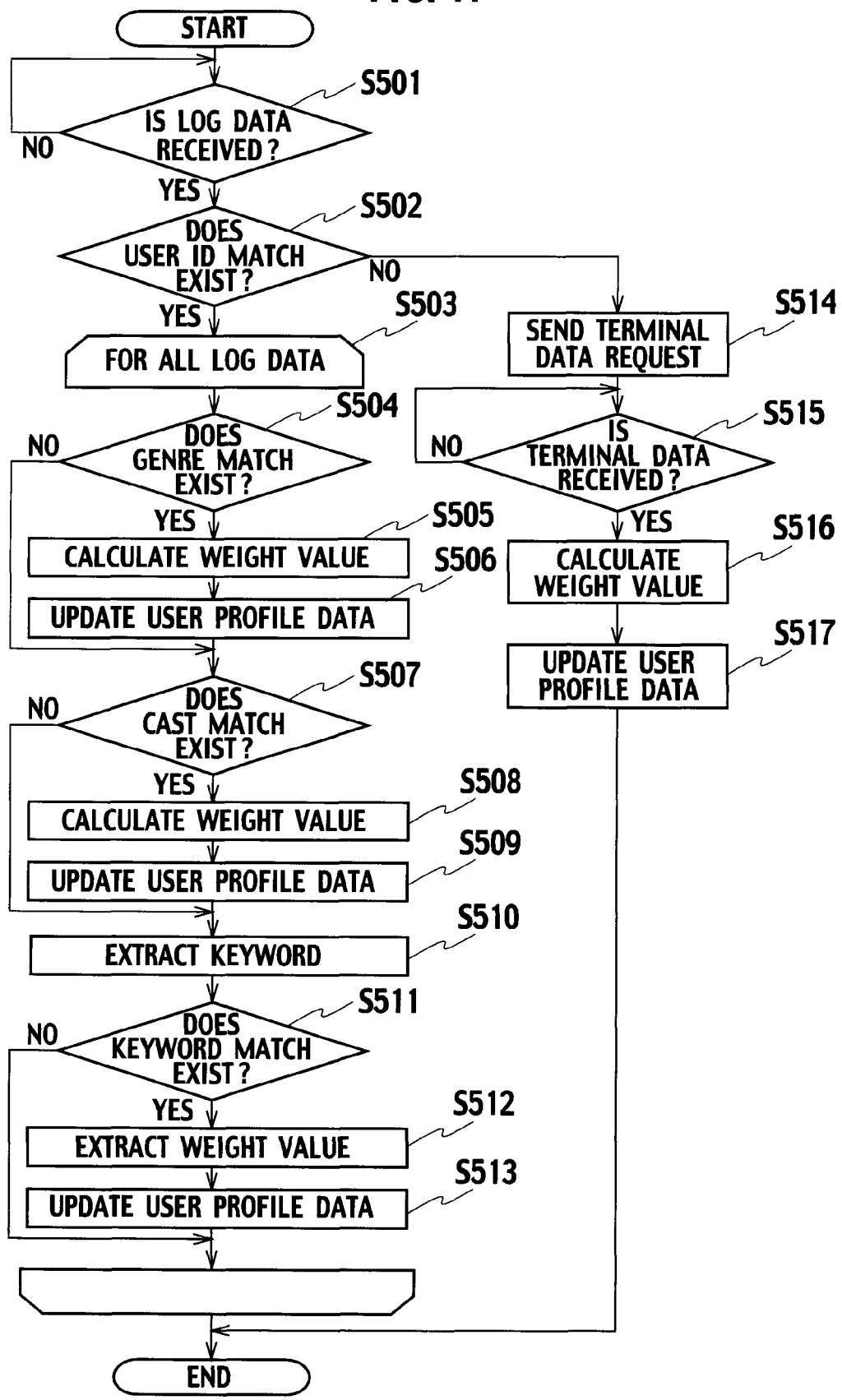
FIG. 17 is a flowchart of assistance in explaining update processing for user profile data, which is executed by the recommending server.

Description will now be given with reference to a flowchart shown in FIG. 17 with regard to update processing for the user profile data stored in the user profile data storage 17a at step S11 in FIG. 2. The user terminal 20 repeats the subscription processing shown in FIG. 15, and thus the data on the log of download is stored in the log data storage 30a of the user terminal 20. The log controller 28 of the user terminal 20 reads out the log data from the log data storage 30a and transmits the log data in conjunction with the user ID to the recommending server 10 at predetermined timing, such as regular timing. When the user terminal 20 downloads plural pieces of content, plural items of log data containing the downloaded content IDs as the keys are stored in the log data storage 30a, and thus the user terminal 20 transmits the user ID in correspondence with the plural items of log data. Upon receipt of the user ID and the log data form the user terminal 20, the recommending server 10 updates the user profile data stored in the user profile data storage 17a.

First, when the communications unit 11 of the recommending server 10 receives the user ID and the log data from the user terminal 20 (YES at step S501), the user decision unit 16a determines whether or not the received user ID is contained in the user profile data stored in the user profile data storage 17a (at step S502).

When the received user ID is contained in the user profile data (YES at step S502), the preference decision unit 16b determines whether or not the genre contained in the preference information in the user profile data containing the received user ID matches the genre contained in the log data received at step S501 (at step S504).

If a genre match exists (YES at step S504), the weight calculator unit 16d calculates the weight value for the pertinent genre (at step S505), and overwrites the weight value in correspondence with the pertinent genre in the user profile data with the new weight value calculated at step S505 to thereby update the user profile data (at step S506).

Then, the preference decision unit 16b determines whether or not the cast contained in the preference information in the targeted user profile data matches the cast contained in the log data received at step S501 (at step S507).

When a cast match exists (YES at step S507), the weight calculator unit 16d calculates the weight value for the pertinent cast (at step S508), and overwrites the weight value in correspondence with the pertinent cast in the user profile data with the new weight value calculated at step S508 to thereby update the user profile data (at step S509).

Then, the keyword extraction unit 16c extracts the keyword (at step S510). Then, the preference decision unit 16b determines whether or not the keyword contained in the preference information in the targeted user profile data matches the keyword extracted at step S510 (at step S511).

When a determination is made that a keyword match exists (YES at step S511), the weight calculator unit 16d calculates the weight value for the pertinent keyword (at step S512), and overwrites the weight value in correspondence with the pertinent keyword in the user profile data with the new weight value calculated at step S512 to thereby update the user profile data (at step S513).

When processing at steps S504 to S513 is completed for all log data received at step S501, the update processing for the user profile data by the user profile data update unit 16 is brought to an end (at step S503).

At the time of receipt of the user ID and the log data from the user terminal 20, when the user decision unit 16a determines that the received user ID is not contained in the user profile data (NO at step S502), the data acquisition unit 16e sends the terminal data request to the user terminal 20 via the communications unit 11 (at step S514), and waits for the terminal data which the user terminal 20 transmits in response to the terminal data request (at step S515).

When the terminal data is received from the user terminal 20 (YES at step S515), the weight calculator unit 16d calculates the weight value in correspondence with the genre, the weight value in correspondence with the cast, and the weight value in correspondence with the keyword (at step S516).

The user profile data is stored in the user profile data storage 17a (at step S517). Specifically, the user profile data contains the issued user ID, and the received terminal data and the weight values calculated at step S516, which are in correspondence with the user ID.

As described above, according to the present invention, the recommending server 10 prestores the preferences of each user terminal 20 as the evaluation data, according to the track record of previous viewing or downloading by the user terminal 20, and predicts, using the evaluation data, the number of accesses to the content server 40 in order to download each individual piece of content. Moreover, the recommending server 10 determines a subscription time at which downloading is permitted for each user terminal 20, according to the predicted number of accesses. The user terminal 20 downloads content from the content server 40 at a time determined using the evaluation data by the recommending server 10. Hence, the recommending system 1 can control network traffic so as to keep a given or less volume of traffic on the network 50 between the user terminal 20 and the content server 40. Thus, the recommending system 1 can prevent a data traffic jam on the network 50 and hence prevent interference with an access of the user terminal 20 to the content server 40. Moreover, the user terminal 20 can download content at a designated time without unwanted delay, since the recommending system 1 eliminates the traffic jam on the network 50.

What is claimed is:

1. A recommending server connected to a user terminal and content server via a network, the recommending server comprising:
   a communications unit that transmits recommendation data to the user terminal upon receipt of recommendation request from the user terminal, the recommendation data containing an identifier of provided content and a subscription time, at which the user terminal is permitted to start downloading the provided content, in correspondence with the identifier of the provided content;
   an evaluation data storage that stores evaluation data containing the identifier of a content, the degree of similarity between the content and an other content, an integrated value that is the number of times the content server has provided the content in correspondence with the similarity, and an identifier of the user terminal, in correspondence with the identifier of the content, that has previously downloaded the other content similar to the content;
   a list data storage that stores content list data containing the identifier of the content, a data size of the content, and a start time, at which the content server starts providing the content, in correspondence with the identifier of the content;
   an extraction unit that extracts the identifier of the content and the similarity in correspondence with the identifier of the user terminal in the evaluation data;
   a sorting unit that sorts, in descending order of similarity value, a plurality of sets of the identifiers of the provided content and similarities stored in a memory, and erases from the memory the sets of the identifiers of the provided content and the similarities after a predetermined position in the sorting order;
   a production unit that produces recommendation data containing the identifier of the provided content in correspondence with the identifier of the user terminal in the evaluation data, and the subscription time in correspondence with the identifier of the provided content, the subscription time being calculated using the similarity extracted by the extraction unit and the start time in correspondence with the identifier of the content in the content list data;
   a holder data storage that stores content holder data containing the identifier of the content and data on download of the content in correspondence with the identifier of the content; and
   a download timetable calculator that calculates the subscription time using the integrated value, the data size, and the data on download, and that outputs the subscription time to the recommendation data production unit.

2. A recommending system, comprising:
   a user terminal to request a recommendation request and a content request;
   a recommending server providing recommendation data to store contents and, providing at least one of contents to the user terminal upon receiving the content request; and,
   a network configured to content the user terminal, the recommending server and the content server to each other,
   the recommending server comprising
      a communications unit that transmits recommendation data to the user terminal upon receipt of recommendation request from the user terminal, the recommendation data containing an identifier of provided content and a subscription time, at which the user terminal is permitted to start downloading the provided content, in correspondence with the identifier of the provided content;
      an evaluation data storage that stores evaluation data containing the identifier of a content, the degree of similarity between the content and a other content, an integrated value that is the number of times the content server has provided the content in correspondence with the similarity, and an identifier of the user terminal, in correspondence with the identifier of the content, that has previously downloaded the other content similar to the content;
      a list data storage that stores content list data containing the identifier of the content, a data size of the content, and a start time, at which the content server starts providing the content, in correspondence with the identifier of the content;
      an extraction unit that extracts the identifier of the content and the similarity in correspondence with the identifier of the user terminal in the evaluation data;
      a sorting unit that sorts, in descending order of similarity value, a plurality of sets of the identifiers of the provided content and similarities stored in a memory, and erases from the memory the sets of the identifiers of the provided content and the similarities after a predetermined position in the sorting order;
      a production unit that produces recommendation data containing the identifier of the provided content in correspondence with the identifier of the user terminal in the evaluation data, and the subscription time in correspondence with the identifier of the provided content, the subscription time being calculated using the similarity extracted by the extraction unit and the start time in correspondence with the identifier of the content in the content list data;
      a holder data storage that stores content holder data containing the identifier of the content and data on download of the content in correspondence with the identifier of the content; and
      a download timetable calculator that calculates the subscription time using the integrated value, the data size, and the data on download, and that outputs the subscription time to the recommendation data production unit.

3. A content recommending method for use in a recommending system comprising steps of:
   extracting, by a recommendation server, a identifier of a content and a similarity in correspondence with a identifier of the user terminal in the evaluation data containing the identifier of a content, the degree of similarity between the content and the other content, an integrated value that is the number of times a content server has provided the content in correspondence with the similarity, and an identifier of the user terminal in correspondence with the identifier of the content that has previously downloaded other content similar to the content;

sorting, in descending order of similarity value, a plurality of sets of the identifiers of the provided content and similarities stored in a memory, and erasing from the memory the sets of the identifiers of the provided content and the similarities after a predetermined position in the sorting order;

calculating, by the recommendation server, a subscription time using the integrated value, a data size in the content list data containing the identifier of the content, a data size of the content, and a start time at which the content server starts providing the content in correspondence with the identifier of the content, and the data on download;

producing, by the recommendation server, that produces recommendation data containing the identifier of the provided content in correspondence with the identifier of the user terminal in the evaluation data, and the subscription time in correspondence with the identifier of the provided content, the calculated subscription time;

transmitting, by the recommendation server, the recommendation data to a user terminal, the recommendation data containing an identifier of provided content and a subscription time, at which the user terminal is permitted to start downloading the provided content, in correspondence with the identifier of the provided content; and transmitting, by the user terminal, the content request to a content server at the subscription time in correspondence with the identifier of the provided content in the recommendation data, when the identifier of the provided content contained in the recommendation data is selected to input an operation signal for downloading the content.

4. A non-transitory computer-readable storage medium storing therein a recommender program product for use in a recommending server, which, when executed by a computer processor, causes the computer to execute steps of:

extracting a identifier of a content and a similarity in correspondence with a identifier of the user terminal in the evaluation data containing the identifier of a content, the degree of similarity between the content and the other content, an integrated value that is the number of times a content server has provided the content in correspondence with the similarity, and an identifier of the user terminal in correspondence with the identifier of the content that has previously downloaded other content similar to the content;

sorting, in descending order of similarity value, a plurality of sets of the identifiers of the provided content and similarities stored in a memory, and erasing from the memory the sets of the identifiers of the provided content and the similarities after a predetermined position in the sorting order;

calculating a subscription time using the integrated value, a data size in the content list data containing the identifier of the content, a data size of the content, and a start time at which the content server starts providing the content in correspondence with the identifier of the content, and the data on download;

producing recommendation data containing the identifier of the provided content in correspondence with the identifier of the user terminal in the evaluation data, and the subscription time in correspondence with the identifier of the provided content, the calculated subscription time; and transmitting the recommendation data to a user terminal, the recommendation data containing an identifier of provided content and a subscription time, at which the user terminal is permitted to start downloading the provided content, in correspondence with the identifier of the provided content.

5. The recommending server according to claim 1, wherein the download timetable calculator includes:

an integrated value extraction unit that extracts from the evaluation data an integrated value in correspondence with the identifier of the provided content and the identifier of the user terminal targeted for the recommendation data production unit;

a size extraction unit that extracts from the content list data a data size in correspondence with the identifier of the provided content;

a data extraction unit that extracts, from the content holder data, data on download of the content in correspondence with the identifier of the provided content; and a calculator unit that calculates the subscription time using the extracted integrated value, the extracted data size, and the extracted data on download.

6. The recommending server according to claim 1, wherein the content list data is further in correspondence with details of the content, the recommending server further comprising:

a user profile data storage that stores user profile data containing the identifier of the user terminal, and the details of the content preferred by the user terminal and a weight value in correspondence with the identifier of the user terminal, the weight value being determined according to the number of times the content containing the details has been downloaded by the user terminal; and an evaluation data update unit that calculates a new degree of similarity by a predetermined equation using the weight value in correspondence with the identifier of the user terminal and the details of the content in the user profile data, and overwrites the degree of similarity contained in the evaluation data with the new degree of similarity, when the details of the content contained in the new content list data stored in the second storage device match the details of the content in correspondence with the identifier of the user terminal in the user profile data.

7. The recommending server according to claim 6, wherein the evaluation data update unit includes:

a preference decision unit that determines whether or not the details of the content contained in the new content list data match the details of the content in correspondence with the identifier of the user terminal in the user profile data;

a weight extraction unit that extracts the weight value in correspondence with the identifier of the user terminal and the details of the content in the user profile data, when the preference decision unit determines that the details of the content contained in the new content list data match the details of the content in correspondence with the identifier of the user terminal in the user profile data; and a calculator unit that calculates a new degree of similarity by a predetermined equation using the extracted weight value, and overwrites the degree of similarity contained in the evaluation data with the new degree of similarity.

* * * * *